US007463384B2

(12) United States Patent  
Tsuchiya et al.

(10) Patent No.: US 7,463,384 B2  
(45) Date of Patent: Dec. 9, 2008

(54) IMAGE FORMING METHOD, IMAGE PROCESSING METHOD AND INK JET RECORDING APPARATUS

(75) Inventors: Okinori Tsuchiya, Yokohama (JP); Naoki Sumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 821 days.

(21) Appl. No.: 11/042,171

(22) Filed: Jan. 26, 2005

(65) Prior Publication Data

US 2005/0168762 A1    Aug. 4, 2005

(30) Foreign Application Priority Data

Jan. 30, 2004    (JP)    ............... 2004-023590

(51) Int. Cl.  
    *H04N 1/60*    (2006.01)
(52) U.S. Cl. ................. 358/1.9; 358/1.2; 358/3.12; 347/100
(58) Field of Classification Search ......... 358/1.9, 358/520, 1.2, 3.12; 347/100, 15  
    See application file for complete search history.

(56) References Cited

U.S. PATENT DOCUMENTS

| 6,508,549 | B1 | 1/2003 | Romano, Jr. et al. | |
|---|---|---|---|---|
| 6,513,923 | B1 | 2/2003 | Evans et al. | |
| 6,761,426 | B2 | 7/2004 | Tsuchiya et al. | |
| 6,843,839 | B2 | 1/2005 | Kanke et al. | |
| 7,229,166 | B2* | 6/2007 | Tomioka et al. | 347/100 |
| 2002/0043175 | A1* | 4/2002 | Walker et al. | 106/31.6 |
| 2002/0080394 | A1 | 6/2002 | Ogasahara et al. | |
| 2003/0030824 | A1 | 2/2003 | Ogasahara et al. | |
| 2004/0004644 | A1* | 1/2004 | Komatsu et al. | 347/15 |
| 2004/0103818 | A1* | 6/2004 | Kataoka et al. | 347/100 |
| 2004/0223172 | A1* | 11/2004 | Yoshizawa et al. | 358/1.1 |
| 2005/0039632 | A1* | 2/2005 | Yamamoto et al. | 106/31.27 |
| 2005/0041082 | A1* | 2/2005 | Kataoka | 347/100 |
| 2007/0046752 | A1* | 3/2007 | Hamajima et al. | 347/100 |
| 2007/0213906 | A1* | 9/2007 | Montgomery | 701/50 |
| 2008/0043268 | A1* | 2/2008 | Bang et al. | 358/1.9 |

FOREIGN PATENT DOCUMENTS

| JP | 11-69176 | 3/1999 |
|---|---|---|
| JP | 2001-138552 | 5/2001 |
| JP | 2002-69348 | 3/2002 |
| JP | 2003-34765 | 2/2003 |
| JP | 2003-39711 | 2/2003 |
| JP | 2003-80682 | 3/2003 |
| WO | WO 00/43451 | 7/2000 |

* cited by examiner

*Primary Examiner*—Kimberly A Williams  
(74) *Attorney, Agent, or Firm*—Fitzpatrick, Cella, Harper & Scinto

(57) ABSTRACT

For obtaining a color reproduction range of a printer closer to the color reproduction range of the positive film, a mere addition of a specific color recording material in the same manner as the recording materials of other colors is insufficient, and, for a specific color showing a large gap from the color reproduction range of the positive film, an application amount different from that of the recording materials of other colors is required for such specific color, in consideration of color developing property. Therefore, in case of forming an image on a recording medium with recording materials of basic colors of cyan, magenta and yellow and recording materials of specific colors different in hue from such basic colors, a maximum application amount per unit area is made larger in at least a recording material of specific color than the application amount of the recording materials of the basic colors.

17 Claims, 26 Drawing Sheets

IMAGE FORMING METHOD, IMAGE PROCESSING METHOD AND INK JET RECORDING APPARATUS

BACKGROUND OF THE INVENTION

1. Field of the Invention

The present invention relates to an image forming method, an image processing method and an ink jet recording apparatus, and more particularly to an image forming method, an image processing method and an ink jet recording apparatus in case of employing a recording material of a specific color different in hue from basic colors.

2. Related Background Art

Together with the recent pervasiveness of information processing apparatus such as personal computers, recording apparatus as an image forming terminals has also shown remarkable development. Among various recording apparatuses, an ink jet recording apparatus, which discharges an ink from a discharge port for recording on a recording medium such as paper, cloth, plastic sheet, OHP sheet etc., has excellent characteristics such as a non-impact recording method of low noise level, an ability for a recording operation of a high density and a high speed, an ability of easily attaining a color recording and an inexpensiveness, and has now become a main stream of the recording apparatus for personal use.

The ink jet recording apparatus has basically adopted a color reproduction by a subtractive color mixing utilizing inks of yellow, magenta and cyan which are three primary colors in printing. More specifically, an image of an orange or red area for example is formed by mixing yellow and magenta colors, also an image of a green area is formed by mixing yellow and cyan colors, and an image of a blue or violet area is formed by mixing magenta and cyan colors.

The advancement of the ink jet recording technology has stimulated developments of recording toward a higher resolution, a higher image quality, a color reproduction and a more inexpensive image formation, and has also contributed significantly to spread the recording apparatus even to personal users, combined with the spreading of personal computer and digital cameras (not only those in single units but also those integrated with other apparatuses such as cellular phones). However, because of such wide pervasiveness, a further improvement in the image quality is being requested even from personal users, and various improvements are being made in order to respond to such requirements.

One of such improvements is a method of employing a black ink in addition to the inks of three primary colors and executing an UCR process of extracting a black component K from the data Y, M and C of the yellow, magenta and cyan colors for replacement by the black ink and removing thus replaced C, M and Y color components, thereby improving a contrast and achieving a stable reproduction of neutral colors. Another method employs, in addition to the yellow, magenta, cyan and black inks, inks of a light cyan color and a light magenta ink thereby reducing granularity of the dots formed by ink deposition onto a recording medium and improving gradation. Also Japanese Patent Application Laid-Open Nos. 2003-39711 and 2003-80682 disclose a technology of assigning a larger number of gradation levels to the light cyan ink and the light magenta ink than in other inks, thereby reducing the granularity not only in a highlight area formed by such light colored inks but also in a medium density area where a dense colored ink and a light colored ink are present together. However, since there is a limitation in the color reproduction by the inks of three colors of yellow, magenta and cyan (or four colors also including black), or even by the inks including light inks of same hues, there is proposed a method of using inks of other colors.

In certain industrial fields such as lithographic printing or dyeing, there may be employed an ink of so-called "specific color". However, such ink is intended specifically for reproducing, in a mass-produced specified image, a specific color (which cannot be reproduced or is difficult to reproduce with the aforementioned four colors and similar colors, such as a metallic color or cobalt blue), and is not intended for use in a general color reproduction.

On the other hand, as a method for realizing a wider image formation, it is also proposed to use, in addition to yellow, magenta and cyan mentioned above, inks of intermediate hue angles in the color space such as red, green or blue, thereby improving the color development and expanding the color reproduction range.

For example Japanese Patent Application Laid-Open No. H11-69176 discloses, for expanding a color range for example in a printer for obtaining a color reproduction of a higher accuracy and a higher image quality, a technology of color-converting television image signals RCRT, GCRT, BCRT by a three-dimensional look-up table (LUT) into C', M', Y', then distributing or converting these data into data of six primary colors C, M, Y, R, G, B by a distribution function utilizing predetermined three variable, and executing a recording with recording materials of such six colors.

Also Japanese Patent Application Laid-Open No. 2001-138552 discloses a technology of employing an orange ink which is in an intermediate area between Y and M in the color space and a green ink which is in an intermediate area between Y and C, for the purpose of expanding the color reproduction range.

Also Japanese Patent Application Laid-Open No. 2003-34765 discloses a technology of employing an orange ink which is in an intermediate area between Y and M in the color space, a green ink which is in an intermediate area between Y and C, and a violet ink which is in an intermediate area between M and C, for the purpose of expanding the color reproduction range.

Now, in consideration of a historical evolution that the wide popularity of the recording apparatus has resulting in a requirement for a higher image quality, then improvements made for meeting such requirement have created new demands and a further improvement in the image quality is being requested, it will be obvious that an image quality far exceeding the photographic quality will also be requested.

In order to realize an image quality far exceeding the photographic quality, it is extremely effect to achieve a clarity, a transparent impression and a stereo impression, and an approach toward such image quality is to assimilate an image formed on a positive film. An image forming on a positive film is a transmission image which functions on the human visual sense by a light transmission from the rear side, and is therefore considered to create a transparent impression and a stereo impression. It is therefore considered effective for further improving the image quality, to realize an image quality causing a transparent impression and a stereo impression, equivalent to those of the transmission image, to the visual sense, in a reflective image.

Consequently, the present inventors have made a comparison of an image formed on a positive film and an image formed with a printer of a wide color reproduction range. An example will be explained in the following.

FIG. 1 shows a plotting of gamuts of an ink jet recording apparatus and a positive film on an a*b* plane of a CIE-L*a*b* system. In FIG. 1, a solid area surrounded by a solid line indicates gamut of the ink jet printer, and an area indicated by points indicates gamut of the positive film. As will be apparent from FIG. 1, the positive film has a larger gamut than in the ink jet printer, in areas of Y to R, G and B.

FIGS. 2A and 2B show the methods for calculating the gamut data shown in FIG. 1. In FIG. 2A, the gamut data of the positive film are obtained by scanning 84 positive films of 8 categories of mountain photos (sunset scenes), sceneries (sea and mountain), flowers, fishes, birds, butterflies, folk dresses and computer graphics. There were employed a scanner Nexscan F4200 manufactured by Heidelberg Gmbh, a color space Wide Gamut RGB. In the Wide Gamut RGB, a white point is represented by D50, and three RGB primary colors have x-y chromaticity values of R (0.73, 0.27), G(0.12, 0.83) and B(0.16, 0.02). A conversion from the Wide Gamut RGB to XYZ can be executed according to:

$X=0.7165 \times R+0.1010 \times G+0.1468 \times B$ $Y=0.2587 \times R+0.7247 \times G+0.0166 \times B$ $Z=0.0000 \times R+0.0512 \times G+0.7739 \times B.$ Conversion from XYZ to L*a*b* was executed according to the CIE definition.

Also in FIG. 1B, the gamut data of the ink jet printer was calculated employing a color patch printed with a recording apparatus Pixus 950i manufactured by Canon Inc. on a recording paper PR-101 manufactured by Canon Inc., and measured with a spectrophotometer Spectro Lino manufactured by Gretab-Macbeth Inc. The used printer executes an image formation with yellow, magenta, cyan, black, light cyan and light magenta colors, and provides a gamut smaller than the gamut of a record obtained from a silver halide-based positive film (referred to as "positive film") shown in FIG. 2A. As shown in FIG. 1, the color reproduction range is deficient particularly in the areas of specific colors such as red, green and blue.

Therefore, a color reproduction was tried by employing recording materials of the specific colors (red and green inks) in addition to the recording materials of other colors (for example yellow, magenta, cyan and black) in same amounts of application. As a result, the color reproduction range was still inferior to that of the positive film though it was expanded in red and green areas, and the difference from the color reproduction range of the positive film was different in respective colors. In the experiment, such difference was larger in the green area than in the red area. It is therefore necessary to widen the color reproduction range even if it is still smaller than that of the positive film.

Based on the foregoing, in order to obtain a color reproduction range of the printer closer to the color reproduction range of the positive film, it is not enough to add the recording material of the specific color in the same manner as the recording materials of other colors, and particularly in a specific color where the difference is large from the color reproduction range of the positive film, it is necessary to employ a different application amount in consideration of such tendency.

Therefore, the present inventors have recognized, in order to expand the color reproduction range appropriate on the a*b* plane in an ink jet recording apparatus and to realize an image quality having a high reproducibility in the transparent impression and stereo impression taking an image of a positive film as a guideline, that an addition of a specific color ink in the same manner as the inks of other color is not enough and that an image design optimum for the recording material of the specific color (such image design including a selection of a recording material of a specific color having appropriate characteristics (lightness and chroma) and an optimum image process and an optimum dot arrangement process exploiting the characteristics of such recording material of the specific color) is effective.

SUMMARY OF THE INVENTION

In consideration of the foregoing, an object of the present invention is to enable a recording of an image excellent in reality, clarity or vividness and granularity as in an image on a positive film, namely an image quality comparable to or exceeding the photographic quality by executing an optimum image design utilizing a recording material of a specific color (such image design including a selection of a recording material of a specific color having appropriate characteristics (lightness and chroma) and an optimum image process and an optimum dot arrangement process exploiting the characteristics of such recording material of the specific color).

Another object of the present invention is to provide an image forming method, an image processing method and an ink jet recording apparatus capable, in consideration of the color developing characteristics of a recording material of a specific color, of a color reproduction of a high chroma in comparison with a color reproduction range obtained by adding the recording material of the specific color in the same manner as the recording materials of other colors.

According to the present invention, there is provided an image forming method for forming an image on a recording medium utilizing recording materials of basic colors of cyan, magenta and yellow and a predetermined recording material of a specific color different in the hue from the basic colors, the method being characterized in that, in case of forming a predetermined color reproducible with the predetermined recording material of the specific color, the predetermined recording material of the specific color is applied in express of a maximum application amount per unit area of the recording medium, determined for the recording materials of the basic colors.

In case of forming a color of a maximum chroma of a predetermined hue reproducible by two basic colors sandwiching a hue angle indicated by the predetermined recording material of the specific color, it is preferred that the application amount of the predetermined recording material of the specific color exceeds a maximum application amount determined for the recording materials of the basic colors. Also in case of forming such color indicating the maximum chroma, it is preferable to use the aforementioned two basic colors in addition to the predetermined recording material of the specific color.

Also according to the present invention, there is provided an image forming method for forming an image on a recording medium utilizing recording materials of basic colors of cyan, magenta and yellow and a predetermined recording material of a specific color different in the hue from the basic colors, including a step of applying a predetermined image processing to multi-value RGB data thereby generating binary data corresponding to the recording materials for image formation, and a step of applying the recording materials onto the recording medium based on thus generated binary data, the method being characterized in that the generation step generates the binary data in such a manner that, for a predetermined hue reproducible by two basic colors sandwiching a hue angle indicated by the predetermined recording material of the specific color, an application amount of the predetermined recording material of the specific color becomes larger than a maximum application amount determined for the recording materials of the basic colors.

The predetermined recording material of the specific color is preferably capable of representing at least either of a higher lightness and a higher chroma than in the color reproduction range reproducible on the recording medium by a combination of arbitrary two recording materials among the recording materials of the basic colors and shows a hue angle within the color reproduction range reproducible by the aforementioned combination of arbitrary two recording materials.

Also the predetermined recording material of the specific color is preferably at least one selected from a group of a green recording material showing a hue angle within the color reproduction range reproducible by a combination of cyan and yellow recording materials, a red recording material showing a hue angle within the color reproduction range reproducible by a combination of magenta and yellow recording materials, and a blue recording material showing a hue angle within the color reproduction range reproducible by a combination of cyan and magenta recording materials.

Also it is preferred that the recording material of the specific color includes, in addition to the predetermined recording material of the specific color, another recording material of a specific color different in hue from the predetermined recording material of the specific color, and that a maximum application amount of the other recording material of the specific color is determined to be less than the maximum application amount of the predetermined recording material of the specific color. It is also preferred that the maximum application amount of the other recording material of the specific color is determined to be the same as the maximum application amount of the recording materials of the basic colors. It is furthermore preferred that the predetermined recording material of the specific color includes a green recording material showing a hue angle within the color reproduction range reproducible by a combination of cyan and yellow recording materials, and that the other recording material of the specific color includes a red recording material showing a hue angle within the color reproduction range reproducible by a combination of magenta and yellow recording materials.

Also according to the present invention, there is provided an image forming method for forming an image on a recording medium utilizing at least a cyan recording material, a yellow recording material and a green recording material showing, within a CIE-L*a*b* color space, a hue angle within a color reproduction range reproducible by a combination of the cyan and yellow recording materials, the method being characterized in that, in forming a predetermined color showing a hue reproducible by a combination of the cyan and yellow recording materials, the green recording material is applied exceeding a maximum application amount per unit area of the recording medium, determined for the cyan and yellow recording materials.

Also according to the present invention, there is provided an image processing method for generating pixel data for use in forming an image on a recording medium utilizing recording materials of basic colors of cyan, magenta and yellow and a recording material of a specific color showing a hue angle within a color reproduction range reproducible by a combination of arbitrary two colors among the three basic colors, including a step of generating pixel data corresponding to the recording materials to be used for the image formation, based on RGB data corresponding to a pixel, the method being characterized in that, in forming pixel data corresponding to a color of a maximum chroma of a predetermined hue reproducible by a combination of predetermined two recording materials of the basic colors among the three recording materials of the three basic colors, pixel data including data corresponding to the predetermined recording material of the specific color are generated in such a manner that an application amount of the predetermined recording material of the specific color showing the hue angle within a color reproduction range reproducible by the combination of the predetermined two recording materials of the basic colors becomes larger than a maximum application amount of the recording materials of the basic colors.

Also according to the present invention, there is provided an image processing method for generating data corresponding to recording materials of basic colors of cyan, magenta and yellow and data corresponding to a predetermined recording material of a specific color different in hue from the basic colors, the method being characterized in that, in generating data for representing a predetermined color reproducible by the predetermined recording material of the specific color, data corresponding to the predetermined recording material of the specific color are generated in such a manner that an application amount of the predetermined recording material of the specific color becomes larger than a maximum application amount of the recording materials of the basic colors.

Also according to the present invention, there is provided an image processing method for generating data corresponding to recording materials of basic colors of cyan, magenta and yellow and data corresponding to a predetermined recording material of a specific color showing a hue angle within a color reproduction range reproducible by a combination of predetermined two recording materials among the recording materials of the basic colors, the method being characterized in that, in forming data representing a color of a maximum chroma of a hue reproducible by the predetermined two recording materials sandwiching a hue angle of the predetermined recording material of the specific color, data corresponding to the predetermined recording material of the specific color are generated in such a manner that an application amount of the predetermined recording material of the specific color becomes larger than a maximum application amount of the recording materials of the basic colors.

Also according to the present invention, there is provided an ink jet recording apparatus characterized in including an image processing part for executing an image processing method according to any of claims 11 to 13, and application means which applies recording materials from an ink jet recording head based on the data generated in the image processing part.

The present invention allows to realize a color reproduction range utilizing a recording material of a specific color closer to the color reproduction range of the positive film, thereby enabling to obtain an image, excellent in clarity or vividness, like an image on a positive film.

Also the present invention enables a color reproduction of a higher chroma, in comparison with a color reproduction range obtained when a recording material of a specific color, which can provide a higher color development, in a similar manner as the recording materials of other colors.

DESCRIPTION OF THE PREFERRED EMBODIMENTS (Color Space Matching Human Visual Characteristics)

In the present specification, a CIE-L*a*b* space is employed as a color space matching the human visual characteristics in comparing the color reproduction ranges or in determining a hue, but such selection is not restrictive and there may be employed any arbitrary color space such as XYZ, CIE-L*a*b*, L*u*v*, a Munsell color representation system, Yxy, L*C*h* and the like. Parts defined by the CIE-L*a*b* color space in the present specification can naturally be defined also by any color space other than CIE-L*a*b* color space.

In the following, embodiments of the present invention will be explained in detail with reference to the accompanying drawings.

In the present specification, "specific color" means, in a wide sense, a color different from the hues of yellow, magenta and cyan of the recording material of the basic colors. Also in a narrower sense, it means either, in the CIE-L*a*b* color space, a color that can represent at least either of a higher lightness and a higher chroma than a color reproduction area reproduced on a recording medium by a combination of arbitrary two recording material among the recording materials of magenta, yellow and cyan basic colors and that represents a hue angle within the color reproduction range represented by a combination of the two arbitrary recording materials, or, in the CIE-L*a*b* color space, a color that can represent a higher lightness and a higher chroma than a color reproduction area reproduced on a recording medium by a combination of arbitrary two recording material among the recording materials of magenta, yellow and cyan basic colors and that represents a hue angle within the color reproduction range represented by a combination of the two arbitrary recording materials.

In the present invention, it is preferable to employ a recording material of a "specific color" of the aforementioned narrow sense, but it is also possible to employ a recording material of a "specific color" of the wide sense.

(Application Amount)

In the present specification, an "application amount" means an ink deposition amount applied per unit area (for example an area corresponding to a pixel) for a single-colored ink. A total application amount means a sum of the application amounts of all the inks used according to a color separation table. Also an (ink) duty ratio, an (ink) deposition amount, an (ink) coating amount etc. are used in a similar meaning.

First Embodiment (Outline of Print System)

Figure 1:
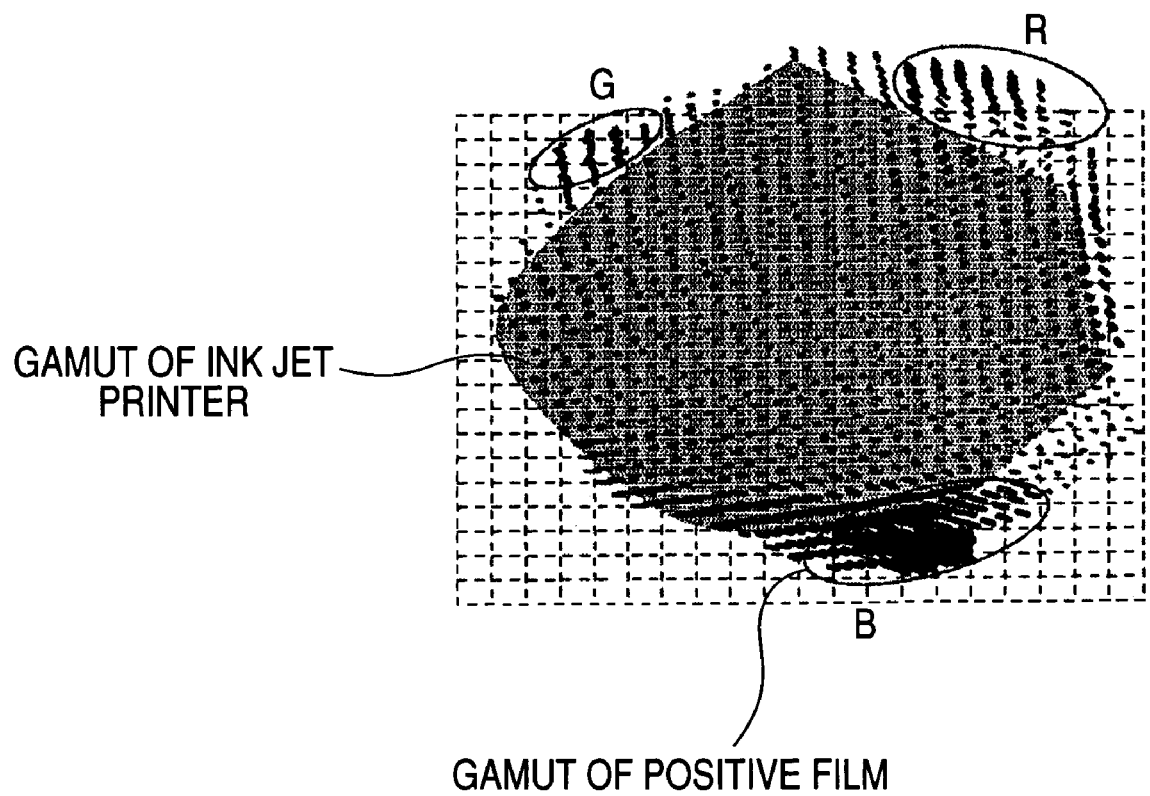
FIG. 1 is a view of gamut of an ink jet recording apparatus and that of a positive film, plotted on a CIE-L*a*b* plane.
Figure 2A:
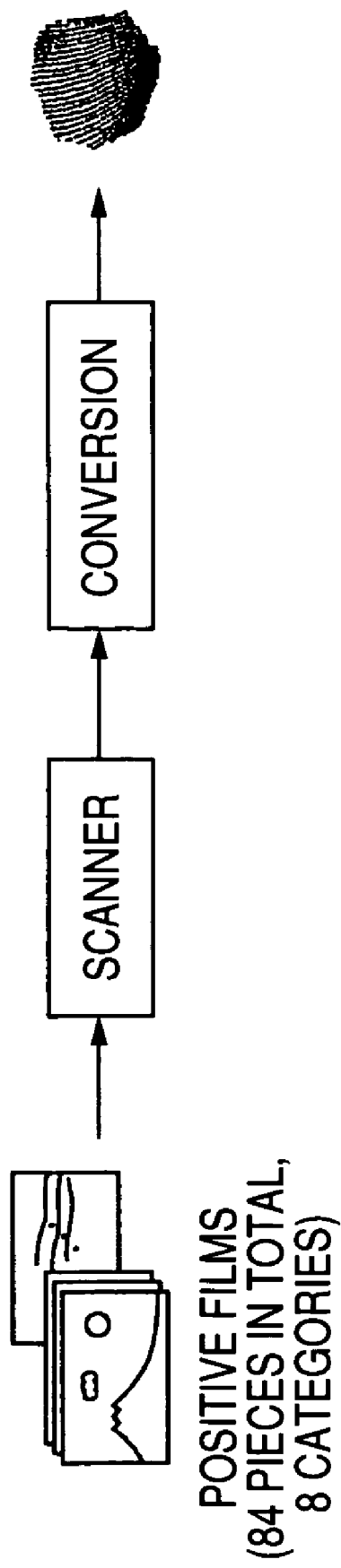
FIGS. 2A and 2B are views showing calculation methods or matters of the gamut data shown in FIG. 1.
Figure 2B:
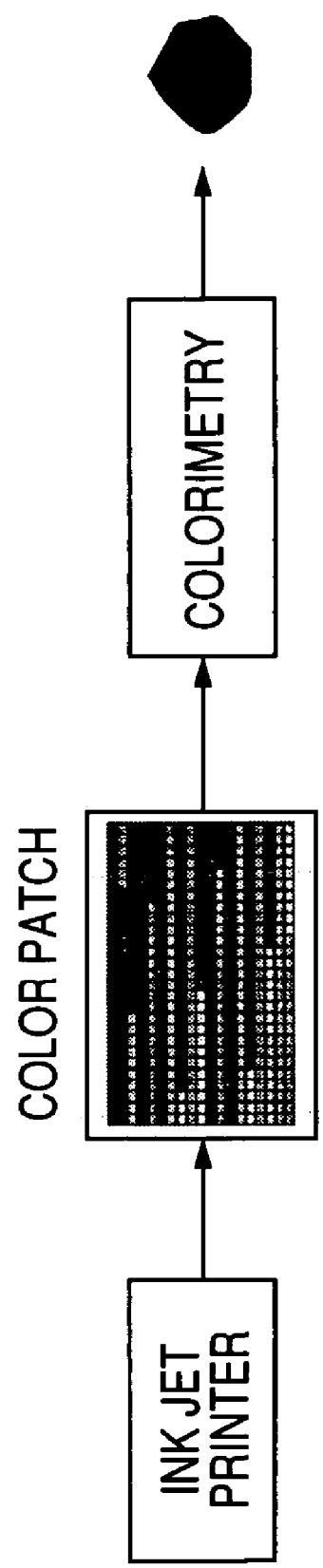
Figure 3:
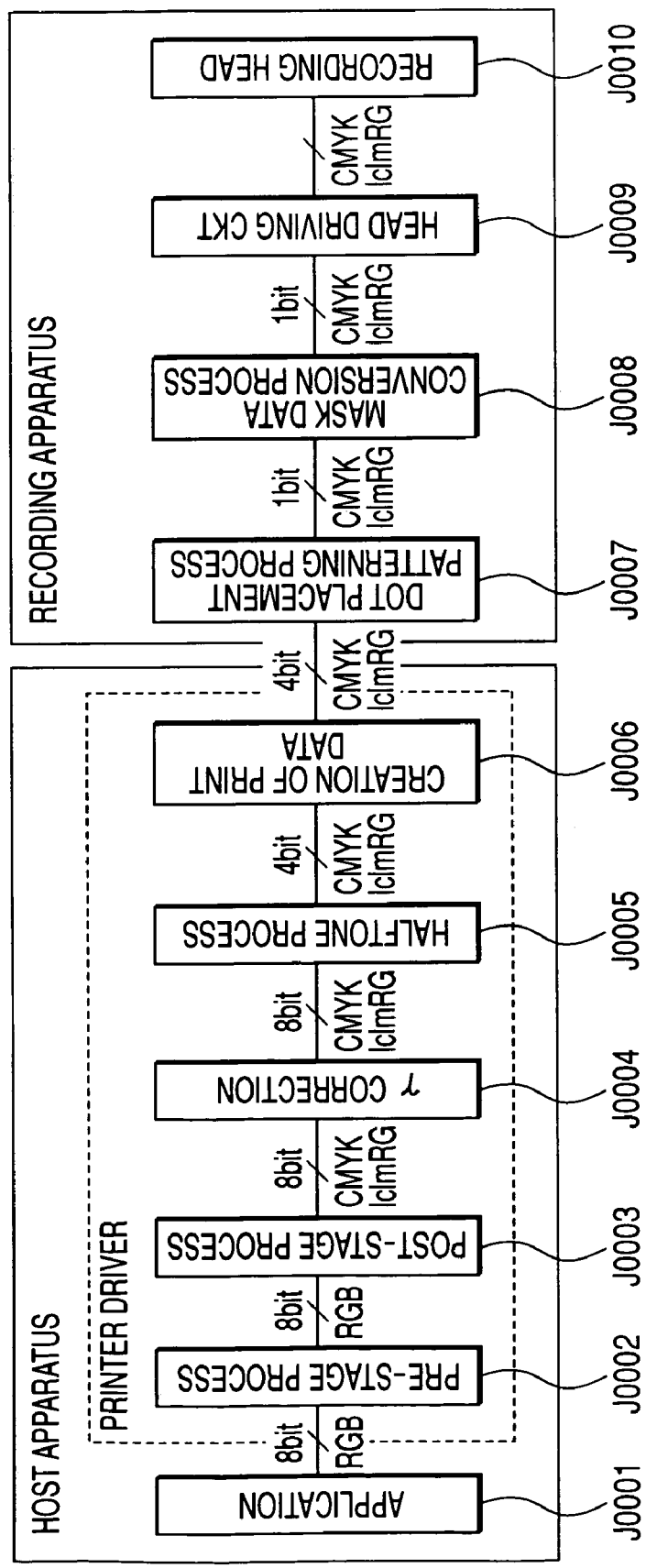
FIG. 3 is a block diagram showing a configuration of a print system constituting a first embodiment of the present invention.

FIG. 3 is a block diagram showing a configuration of a print system constituting a first embodiment of the present invention. The printer of the present embodiment executes printing with inks of basic colors of cyan, magenta, yellow and black, light inks of light cyan and light magenta and specific color inks of red and green, and employs a recording head capable of discharging inks of such 8 colors for this purpose. As shown in FIG. 3, the print system of the present embodiment is constituted of a printer as a recording apparatus utilizing such specific color inks and a personal computer (PC) as a host apparatus.

Programs functioning on an operating system of the host apparatus include an application and a printer driver. An application J0001 executes a process for preparing image data to be printed by the printer. Such image data or data prior to an editing thereof may be fetched into the PC from various media. The PC of the present embodiment can fetch, by a CF card, image data of for example JPEG format, taken by a digital camera. It can also fetch image data of for example TIFF format read by a scanner or image data stored in a CD-ROM. It can further fetch web through the internet. Such fetched data are displayed on a monitor of the PC for editing or processing through the application J0001, thereby providing image data R, G, B for example of sRGB format. Such image data are transferred to a printer driver in response to a print instruction.

The printer driver of the present embodiment includes a pre-stage process J0002, a post-stage process J0003, a γ-correction J0004, a halftoning J0005 and a print data creation J0006. The pre-stage process J0002 executes a color range (gamut) mapping. The pre-stage process J0002 of the present embodiment utilizes a three-dimensional LUT for projecting a color range reproduced by the image data R, G, B of the sRGB format into the color range reproducible with the printer of the present print system in cooperation with an interpolation process, thereby 8-bit image data R, G, B into data R, G, B within the color range of the printer. The post-stage process J0003 executes a process, based on the data R, G, B thus mapped within the color range, of determining color separation data Y, M, C, K, lc, lm, R, G corresponding to ink combinations for reproducing the ink represented by such data. In the present embodiment, such process is executed by a three-dimensional LUT with an interpolation process as in the pre-stage process. The γ-correction G0004 executes a conversion of gradation values of the data of each color in the color separation data determined in the post-stage process J0003. More specifically, a one-dimensional LUT corresponding to the gradation characteristics of ink of each color employed in the printer of the present system is employed to execute a conversion for linearly correlating the color separation data to the gradation characteristics of the printer. The halftoning J0005 executes a quantization for converting each of 8-bit color separation data Y, M, C, K, lc, lm, R, G into 4-bit data. In the present embodiment, an error diffusion method is employed to convert 8-bit data into 4-bit data. Such 4-bit data serves as an index for an arrangement pattern in a patterning of the dot arrangement in the recording apparatus. Finally, the print data creation process J0006 prepares print data by adding print control information to the print image data including the aforementioned 4-bit index data. These processes of the application and the printer driver are executed by a CPU according to programs therefor. In such execution, the program is read from a ROM or a hard disk, and a RAM is used as a work area.

The recording apparatus executes, for data processing, a dot placement patterning process J0007 and a mask data conversion process J0008. The dot placement patterning process J0007 executes, for each pixel corresponding to an actual print image, a dot placement according to a dot placement pattern corresponding to the 4-bit index data (gradation value information) constituting the print image data. By assigning, to each pixel represented by the 4-bit data, a dot placement pattern corresponding to the gradation value of such pixel, an on-off state of dot is defined for each of plural areas within the pixel, and discharge data (binary data) "1" or "0" is assigned in each area within the pixel. The 1-bit discharge data thus obtained are subjected to a mask process by the mask data conversion process J0008. More specifically, for completing a recording of a scan area of a predetermined width by the recording head in plural scans, the discharge data in each scan are generated by a process utilizing a mask corresponding to each scanning. The discharge data Y, M, C, K, lc, lm, R, G corresponding to each scan are supplied at a suitable timing to a head driving circuit J009, thereby driving a recording head J0010 and discharging the respective inks corresponding to such discharge data. The dot placement patterning process and the mask data conversion process in the recording apparatus are executed by exclusive hardware circuits under the control of the CPU constituting a controller of the recording apparatus. However, such processes may be executed by the CPU according to a program or for example by a printer driver in the PC, and it will be apparent also from the following description that such processes may be executed in any form in realizing the present invention.

The printer of the present embodiment explained above utilizes red and green inks as specific colors, and it is preferable that such specific color ink can represent a higher chroma and a higher lightness than those in color of same hue of a secondary color formed by mixing two of the basic color inks of yellow, magenta and cyan, but such situation is not restrictive and there may be employed an ink that can represent at least either of a higher lightness and a higher chroma than in the aforementioned secondary color. Thus, more specifically, the "specific color" advantageously employed in the present embodiment means a color which, in the CIE-L*a*b* color space, is higher in at least either of the lightness and the chroma than in the color reproduction range reproduced on the recording medium by a combination of two arbitrary recording materials of the basic colors of magenta, yellow and cyan and indicates a hue angle within the color reproduction range reproducible by the combination of the two arbitrary recording materials. It is more preferably that the color can represent a higher lightness and a higher chroma than the color reproduction range.

Also in the present embodiment, the specific color of red ink allows to realize at least either of a higher chroma and a higher lightness than a color space reproducible by input image data R, G, B of the sRGB format employed for example in a monitor. The present embodiment will be explained by a printer employing inks as recording materials, but it will be apparent from the following description that the description is applicable, except for descriptions specific to the inks themselves, also to a printer, a copying apparatus or the like utilizing other recording materials such as toner.

Also in the present specification, the inks constituting the recording materials will be represented by English terms such as Cyan, Light Cyan, Yellow, Magenta, Light Magenta, Black, Red and Green, while colors, hues or data thereof will be represented by a capital letter or a combination of a capital latter and a lower-case letter such as C, lc, M, lm, Y, K, R, G and B. More specifically, C indicates a cyan color, data or hue thereof; M indicates a magenta color, data or hue thereof; Y indicates a yellow color, data or hue thereof; K indicates a black color, data or hue thereof; R indicates a red color, data or hue thereof; G indicates a green color, data or hue thereof; and B indicates a blue color, data or hue thereof. Paper white is represented as White or W.

Also in the present specification, "pixel" means a minimum unit of gradational presentation, or a minimum unit subjected to an image processing (pre-stage process, post-stage process, γ-correction, halftoning, etc.) for multi-value data of plural bits. In the halftoning process, as will be explained later, a pixel corresponds to a pattern constituted of M×N (such as 2×4 or 2×8) squares, and each square within a pixel is defined as an area. Such "area" is a minimum unit for which dot on/off is defined. In this relation, "image data" in the pre-stage process, post-stage process or γ-correction means an assembly of pixels to be subjected to such process. In the present embodiment, each pixel is data having 8-bit gradation value, and "pixel data" in halftoning process indicate pixel data themselves to be subjected to the processing. In the halftoning process of the present embodiment, the pixel data having such 8-bit gradation value are converted to pixel data (index data) having a 4-bit gradation value.

In the following the process blocks or elements of the print system of the present embodiment will be explained in detail.

(Pre-Stage Process)

The pre-stage process J0002 of the present embodiment executes, as explained in FIG. 3, a readout of lattice point data utilizing an LUT and an interpolation based thereon, thereby converting 8-bit input data R, G, B from an application into color correction data (=R', G', B' post-process data) capable of providing appropriate reproduced colors. In this process, for obtaining a color reproduction of a desired photographic quality such as a color reproduction on an sRGB monitor, a gamut mapping technology is utilized for achieving a color matching which combines a color reproduction range of the printer, in the specific color system to be realized by the post-stage and ensuing processes and indicated by a broken line and a solid line in FIG. 5, with an appropriate color target on a uniform color space such as L*a*b*. The gamut mapping technology and the interpolation technology for table interpolation can be suitably selected from known ones. Also the pre-stage process need not necessarily be based on a table but can also be realized by an appropriate linear or non-linear color correction function.

(Post-Stage Process)

The post-stage process of the present embodiment executes, as explained in FIG. 3, a readout of lattice point data utilizing an LUT and an interpolation based thereon, thereby converting the input data R', G', B' into color separation data C, M, Y, K, lc, lm, R, G. The LUT outlined in FIG. 4 stores, as lattice point data, the color separation data for realizing gradation values or a color range to be explained later.

Figure 5:
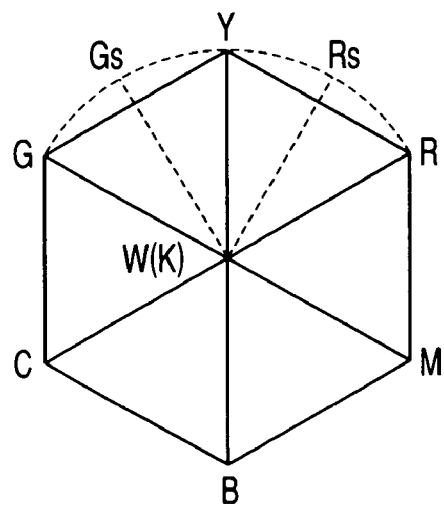
FIG. 5 is a schematic chart of a color range (gamut) reproduced by entire color separation data of the first embodiment.

FIG. 5 is a schematic view of color range (gamut) reproducible by the entire color separation data of the present embodiment, and shows an a*b* plane in the CIE-L*a*b* space.

Figure 25:
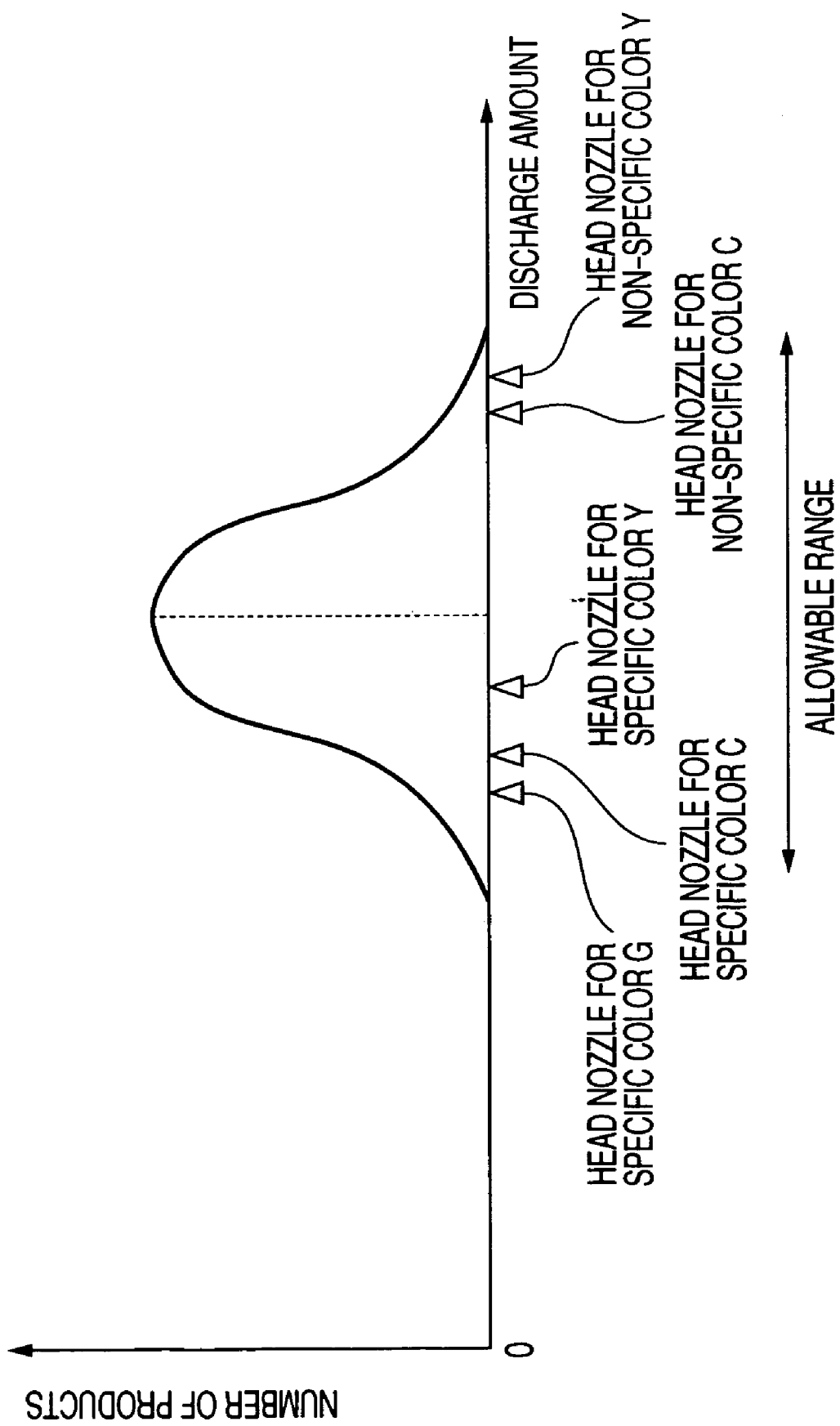
FIG. 25 is a view showing a discharge amount distribution generated in the manufacture of recording nozzles of a recording head employed in the first embodiment of the invention.

In FIG. 5, a hexagon indicated by solid lines (area surrounded by 6 hues CMYRGB) shows a color range reproducible by the inks of Cyan, Light Cyan, Yellow, Magenta, Light Magenta and Black, and broken lines indicate an expanded color range reproducible employing specific color inks of Red and Green of the present embodiment, in addition to these inks. In this color range, hues Rs and Gs are hues of the specific color inks Red and Green. As will be apparent from FIG. 5, the specific color inks of the present embodiment have hues Rs, Gs selected respectively between hues Y and R and between hues G and Y. Also the specific color inks Red, Green of the present embodiment are capable, as will be explained later, of realizing a color range of a higher lightness and a higher chroma in comparison with the colors of same hues realizable in a non-specific color ink system not utilizing the specific color inks. In the present specification, a "higher chroma" or a "higher lightness" in a specific color recording material is used in this meaning, unless specified otherwise. Such higher chroma and higher lightness can reproduce an expanded color range in comparison with the color range obtainable with the aforementioned ink system. In the following, there will be explained in detail how the specific color inks Red and Green in an embodiment of the invention are used, or how color separation data R corresponding to the Red ink and G corresponding to the Green ink Green are set at the lattice points of the LUT, and how the color range is expanded as a result. As explained in the foregoing, the color reproduction range in a specific color ink system depends largely on the color reproduction characteristics of the specific color recording materials. Therefore, there will be at first explained the Red ink and the Green ink to be employed in the present embodiment and the color reproduction characteristics thereof. In the following, the color reproduction characteristics will be described in case of employing a recording head having an ink discharge amount corresponding to a center value of a fluctuation in the manufacture indicated by a broken line in FIG. 25, unless specified otherwise. FIG. 25 shows a fluctuation of the discharge amount in the manufacture, and a position at the right-hand side of a center of the discharge amount indicated by a broken line indicates a head of a relatively large discharge amount, and a position at the left-hand side of the center indicates a head of a relatively small discharge amount.

[Ink Characteristics]

[Ink Composition]

The yellow, magenta, cyan or black ink advantageously employed as basic color in the first embodiment, or the red or green ink as the specific color contains a colorant as an essential component.

The colorant employed in the inks of the basic colors (three primary colors of yellow, magenta and cyan, and black) in the first embodiment can be a dye or a pigment. In particular, a dye is advantageous as it is excellent in reproducing a color of a high lightness. Also the colorant employed in the inks of the specific colors (red, green and blue) can be a dye or a pigment.

In particular, a dye is advantageous as it is excellent in reproducing a color of a high lightness.

It is strongly desirable to employ an ink which penetrates the recording medium upon application (dye-based ink showing such tendency) rather than an ink which agglomerates on the surface of the recording medium (pigment-based ink showing such tendency). This is because, in the latter case, the incident light is mostly reflected by an uppermost ink layer deposited later, while, in the former ink, the incident light is reflected in the ink layers of respective colors formed inside the recording medium, thereby providing an effect of providing a stereo impression and a transparent impression.

In the following there will be shown specific examples of the colorants for the inks of basic colors and specific colors to be employed in the first embodiment, and suitable ones matching the aforementioned conditions can be selected from such examples:

Cyan Colorant

C. I. Direct Blue: 1, 15, 22, 25, 41, 76, 77, 80, 86, 90, 98, 106, 108, 120, 158, 163, 168, 199, 226, 307;

C. I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, 244.

Yellow Colorants

C. I. Direct Yellow: 8, 11, 12, 27, 28, 33, 39, 44, 50, 58, 85, 86, 87, 88, 89, 98, 100, 110, 132, 173;

C. I. Acid Yellow: 1, 3, 7, 11, 17, 23, 25, 29, 36, 38, 40, 42, 44, 76, 98, 99.

Magenta Colorant

C. I. Direct Red: 2, 4, 9, 11, 20, 23, 24, 31, 39, 46, 62, 75, 79, 80, 83, 89, 95, 197, 201, 218, 220, 224, 225, 226, 227, 228, 229, 230;

C. I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289;

C. I. Food Red: 87, 92, 94;

C. I. Direct Violet: 107.

Also there can be employed compounds of a structure described in Japanese Patent Application Laid-Open No. 2002-069348.

Black Colorant

C. I. Direct Black: 17, 19, 22, 31, 32, 51, 62, 71, 74, 112, 113, 154, 168, 195;

C. I,. Acid Black: 2, 48, 51, 52, 110, 115, 156;

C. I. Food Black: 1, 2.

Carbon Black

Also there can be employed compounds of a structure described in International Publication No. WO 00/43451.

Red colorant

C. I. Acid Orange: 7, 10, 33, 56, 67, 74, 88, 94, 116, 142;

C. I. Acid Red: 111, 114, 266, 374;

C. I. Direct Orange: 26, 29, 34, 39, 57, 102, 118;

C. I. Food Yellow: 3;

C. I. Reactive Orange: 1, 4, 5, 7, 12, 13, 14, 15, 16, 20, 29, 30, 84;

C. I. Disperse Orange: 1, 3, 11, 13, 20, 25, 29, 30, 31, 32, 47, 55, 56.

Also there can be utilized an appropriate mixture of the yellow colorant and the magenta colorant mentioned above.

Green Colorant

C. I. Direct Blue: 1, 15, 22, 25, 41, 76, 77, 80, 86, 90, 98, 106, 108, 120, 158, 163, 168, 199, 226, 307;

C. I. Acid Blue: 1, 7, 9, 15, 22, 23, 25, 29, 40, 43, 59, 62, 74, 78, 80, 90, 100, 102, 104, 112, 117, 12;

C. I. Food Yellow: 3.

Also there can be employed an appropriate mixture of the following colorants:

C. I. Acid Green: 5, 6, 9, 12, 15, 16, 19, 21, 25, 28, 81, 84;

C. I. Acid Green: 5, 6, 9, 12, 15, 16, 19, 21, 25, 28, 81, 84;

C. I. Direct Green: 26, 59, 67;

C. I. Food Green: 3;

C. I. Reactive Green: 5, 6, 12, 19, 21;

C. I. Disperse Green: 6, 9.

The light cyan colorant may be same as or different from the cyan colorant, and there can be suitably employed an ink having a relatively low colorant density in comparison with the cyan ink formulated at the same time and matching conditions of recording and recovery. Also conditions for the light magenta colorant are similar to those for the light cyan colorant.

Also the ink may contain, if necessary, for example in an ink to be used in an ink jet recording apparatus of personal use, in addition to water as a carrier component, a water-soluble organic solvent or a humidifier for preventing drying, a surfactant, a pH regulating agent, an antiseptic and the like in consideration of reliability.

In the present embodiment the foregoing colorants are shown as an example of preferable colorant, but a combination of the colorants in which the present invention becomes effective is not limited to that described above and there may be employed other colorants.

[Color Reproduction Characteristics of Ink]

In the following, color reproduction characteristics of the Red ink employed in the present embodiment will be explained in detail, in comparison with those of a non-specific color system in which Magenta, Light Magenta and Yellow inks are used in a mixture.

Figure 4:
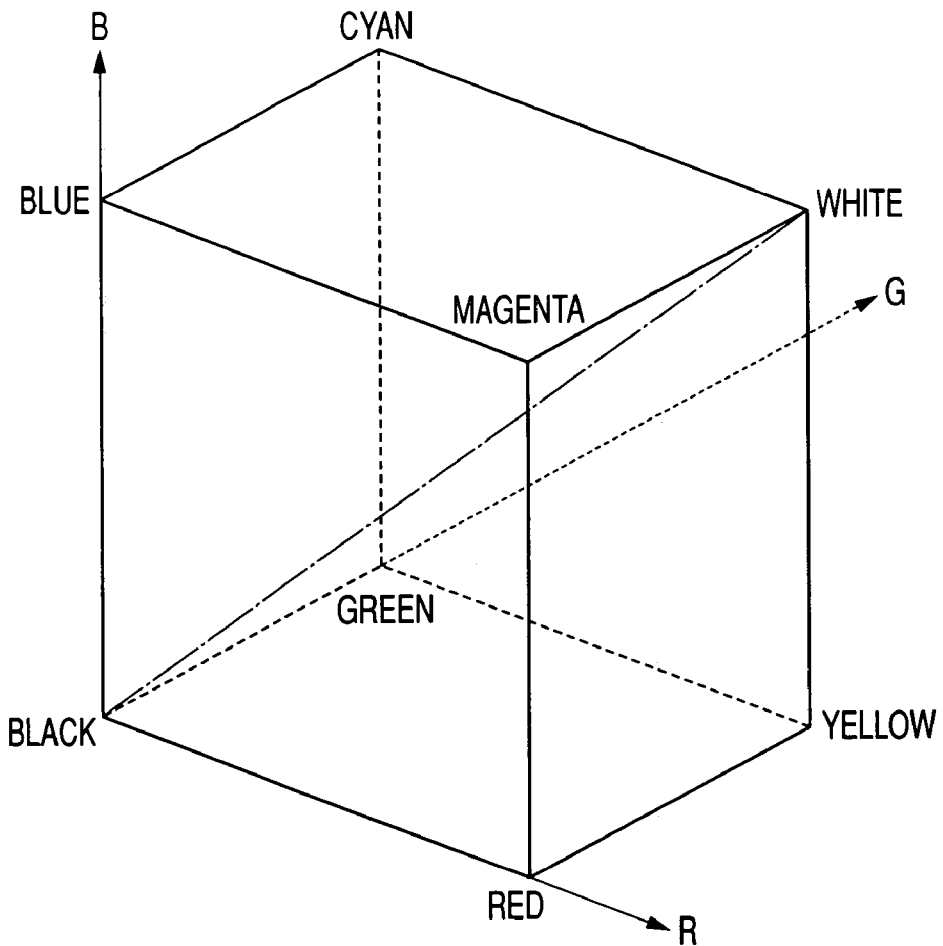
FIG. 4 is a view showing a concept of a color separation LUT.
Figure 12A:
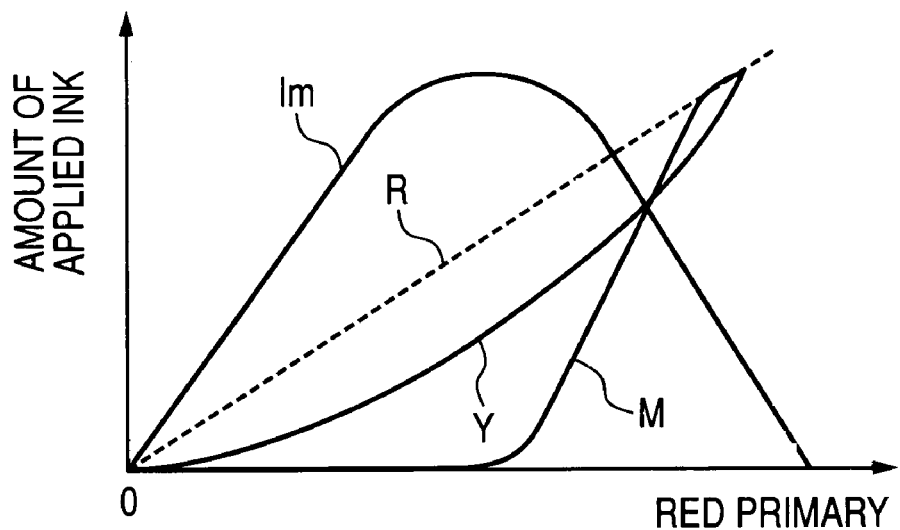
FIG. 12A is a view showing a red ink (broken line) and a color separation (fine solid lines) of a non-specific color system reproducing equivalent hue and lightness.
Figure 12B:
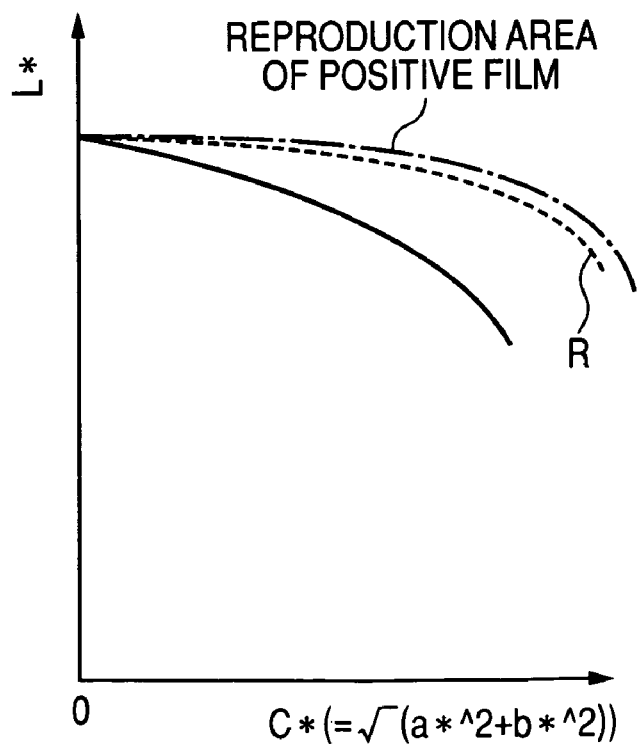
FIG. 12B is a schematic comparison chart showing, on a lightness (L*)-chroma (C*) plane, a color reproduction range (broken line) reproduced by the red ink shown in FIG. 12A (broken line), a color reproduction range (fine solid line) reproduced by the color separation in the non-specific color system shown in FIG. 12A (fine solid line), and a reproduction range (chain line) of a positive film in a corresponding hue.

FIG. 12A is a view showing a color separation along a line W (RGB=0xFFFFFF)-R (RGB=0xFF0000) in FIG. 4, and FIG. 12B shows a color reproduction realized by such color separation table, on an L* (lightness)-C* (chroma) plane.

In order to approach, with the conventional non-specific color ink system, as far as possible to the hue-lightness line (broken line in FIG. 12B) attained with the Red ink indicated by a broken line in FIG. 12A, there is employed a composition of Magenta, Light Magenta and Yellow as indicated by solid lines in FIG. 12A. As the specific color system (Red) and the non-specific color system (M, lm, Y) in such state provide the color reproduction ranges respectively shown by a broken line and a solid line in FIG. 12B, it will be understood that the use of the specific color ink provides a color reproduction of a higher lightness and a higher chroma, not attainable with the non-specific color ink system. Also the use of the specific color system (Red) realizes a color reproduction range which approximately covers the color reproduction range of a positive film, indicated by a chain line.

Figure 13A:
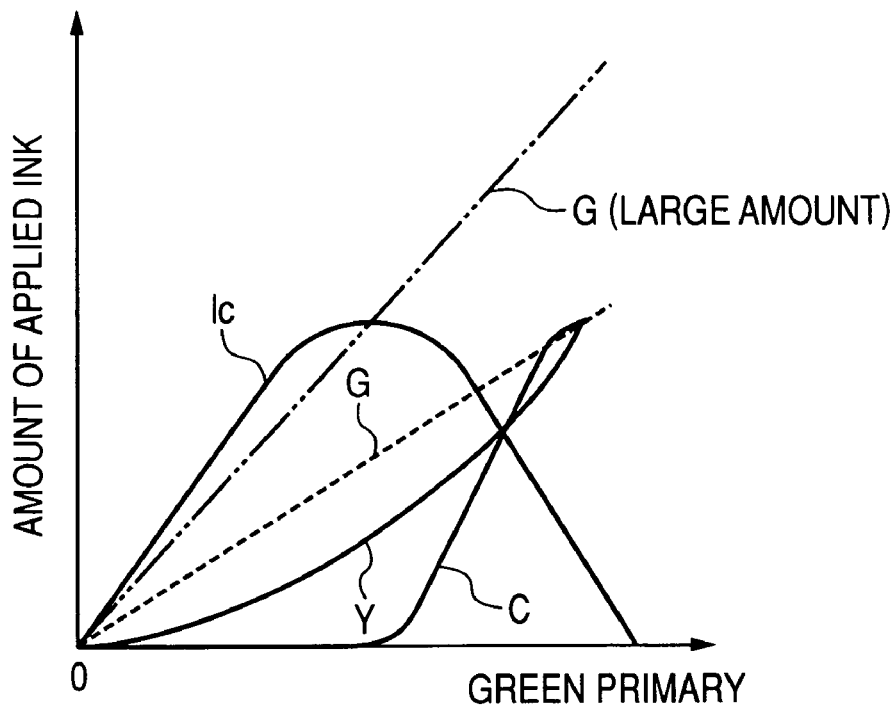
FIG. 13A is a view showing a green ink (broken line), a color separation (fine solid lines) of a non-specific color system reproducing equivalent hue and lightness, and a specific color ink of the invention applied in an amount in excess of an application amount recordable with other colors (chain double-dashed line)
Figure 13B:
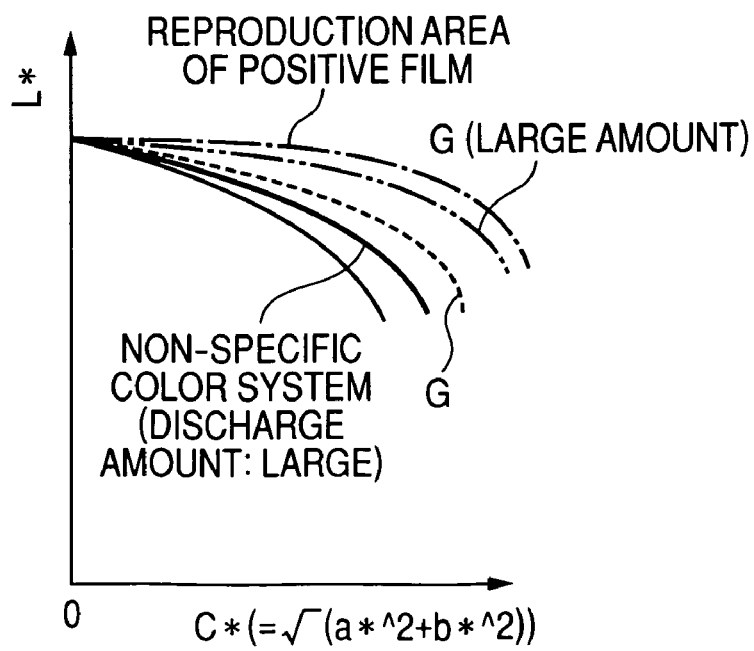
FIG. 13B is a schematic comparison chart showing, on a lightness (L*)-chroma (C*) plane, a color reproduction range (broken line) reproduced by the green ink shown in FIG. 13A (broken line), a color reproduction range (fine solid line) reproduced by the color separation in the non-specific color system shown in FIG. 13A (fine solid line), a reproduction range (chain line) of a positive film in a corresponding hue, a color reproduction range in case a specific color ink of the invention applied in an amount in excess of an application amount recordable with other colors (chain double-dashed line), and a color reproduction range (thick solid line) of a non-specific color system with a larger ink discharge amount of the recording nozzle.

FIG. 13A is a view showing a color separation along a line W (RGB=0xFFFFFF)-G (RGB=0x00FF00) in FIG. 4, and FIG. 13B shows a color reproduction realized by such color separation table, on an L* (lightness)-C* (chroma) plane.

With respect to the color reproduction characteristics of the Green ink, in order to approach as far as possible to the hue-lightness line (broken line in FIG. 13B) attained with the Green ink indicated by a broken line FIG. 13A, there is employed a composition of Cyan, Light Cyan and Yellow as indicated by solid lines in FIG. 13A. As the specific color system (Green) and the non-specific color system (C, lc, Y) in such state provide the color reproduction ranges respectively shown by a broken line and a fine solid line in FIG. 13B, the use of the specific color ink provides a color reproduction of a higher chroma, not attainable with the non-specific color ink system. However, the effect in color reproduction attained by the use of the Green ink is relatively smaller than that attained by the use of the Red ink. Also the target color reproduction range of the positive film, indicated by a chain line in FIG. 13B, cannot be reached, and there is a relatively large gap therefrom.

The color reproduction range indicated by the broken line in FIG. 13B is obtained when the Green ink is discharged, by a head of a discharge amount at the center in FIG. 25, with a maximum application amount selected same as the maximum application amount of inks of other colors. Thus FIG. 13B indicates that, even when the Green ink is added in anticipation for an expansion of the color reproduction range, as long as the application amount of the Green ink is selected same as that for other color inks, it is not at all possible to reach the color reproduction range of the positive film and the objective of approaching to the color reproduction range of the positive film cannot be attained sufficiently.

Figure 6:
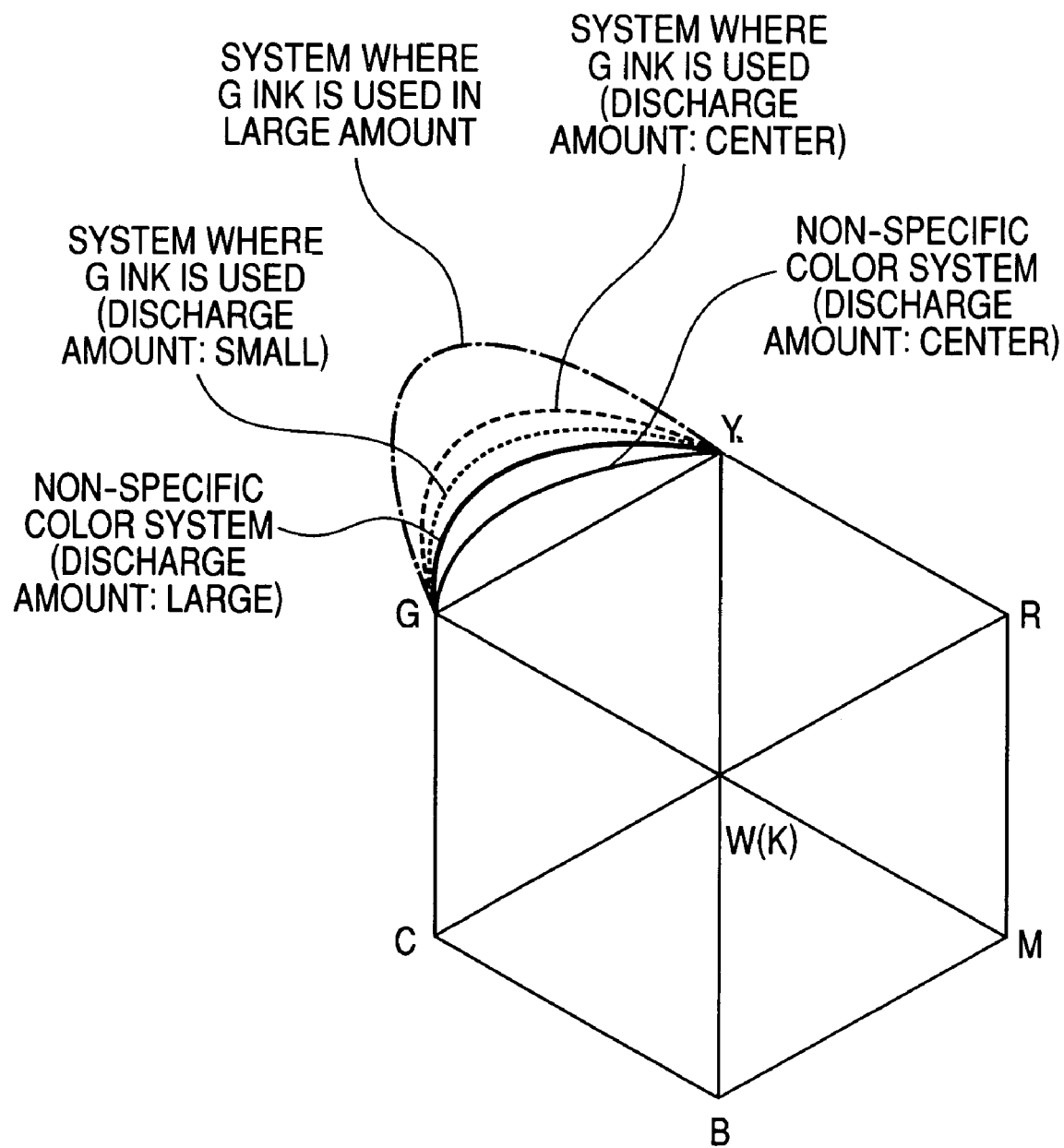
FIG. 6 is a schematic chart of a color range (gamut) reproduced by entire color separation data of the first embodiment, in case ink discharge, amounts are changed for a specific color recording nozzle and basic color recording nozzles.

Also, the discharge amount of the recording head involves a fluctuation in the manufacture, as already explained in FIG. 25. Therefore, there may occur situations where, in a printer of a non-specific color system, a head of a high discharge amount, positioned at the right-hand side of the center discharge amount in FIG. 25, is used for Cyan and Yellow colors and, in a printer of a specific color system, a head of a low discharge amount, positioned at the left-hand side of the center discharge amount in FIG. 25, is used for Green, Cyan and Yellow colors. In such cases, the respective color reproduction ranges assume, on the a*b* plane in FIG. 6, a thick solid line indicating "non-specific color system (large discharge amount)" and a dotted line indicating "G ink system (small discharge amount)", and there is not much difference between the two. Also, even in case the head used in the printer of the specific color system has a center discharge amount, the color reproduction range is merely shifted to a broken line indicating "G ink system (center discharge amount)" and the color reproduction range is still not much different from that of the printer of the non-specific color system with the large discharge amount. A similar situation can be observed also in FIG. 13B. Namely a color reproduction range (indicated by a broken line in FIG. 13B) of a specific color system utilizing a head of a center discharge amount is not much different from a color reproduction range (indicated by a thick solid line in FIG. 13B) of a non-specific color system utilizing a head of a large discharge amount. Because of such fluctuation in the manufacture, there may result a situation where the color reproduction range of a specific color system utilizing a specific color ink is not much different from the color reproduction range of a conventional non-specific color system, whereby the advantages of such specific color system may not be sufficiently given to the user.

Therefore, the present invention is so constructed as to use the Green ink in a larger amount than other color inks, as shown in FIG. 13A. More specifically, a maximum application amount per unit area is selected larger for the Green ink than for other color inks. In this manner, it is rendered possible to expand the color reproduction range of Green area as indicated by a chain line in FIG. 13B, and to obtain a color reproduction of a higher chroma, very close to the color reproduction range of the positive film.

[Color Separation Table used in Post-Stage Process]

In the following there will be explained a structure of a color separation table to be used in the post-stage color process of the present embodiment, based on the aforementioned color reproduction characteristics of the inks. In the following there will be described parts featuring the use of specific color inks (Red and Green inks in the present embodiment), while other parts are similar to a known non-specific color system (for example 6-color CMYKlclm system).

In the present embodiment, in the entire color space shown in FIG. 4, at first a one-dimensional color separation table is set for each of solid lines and broken lines, and, in any other part, a lattice point value is obtained by an interpolation based on a known table interpolating technology for example as disclosed in Japanese Patent Application Laid-Open No. 2003-80682.

[Color Separation in Range where Red Ink is Used]

At first there will be explained a color separation utilizing the Red ink.

The Red ink is utilized in a tetragonal pyramidal region WYRM-K, shown in FIG. 4, defined by a line W(RGB=0xFFFFFF)-R(RGB=0xFF0000)-K(0x000000), and a line Y(RGB=0xFFFF00)-R(RGB=0xFF0000)-M (0x00FF) and an interpolation of these lines.

Figure 7:
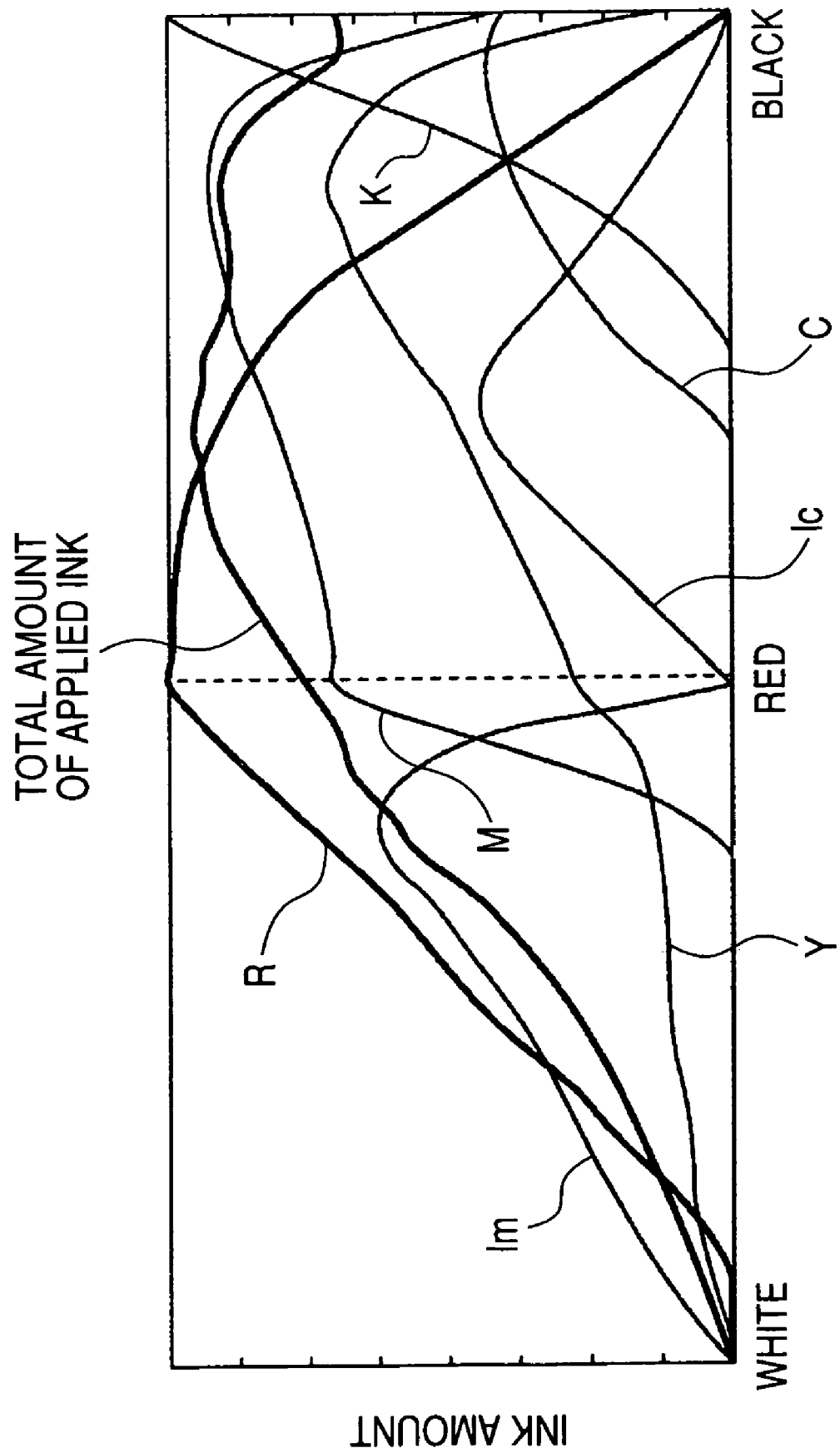
FIG. 7 is a chart showing color separation data of lattice point data on a white-red-black line in the color separation LUT of the first embodiment.

On the W-R-K line, in order to exploit the high lightness and the high chroma of the Red ink, the Red ink is progressively increased from the white point (W) to the Red point (RGB=0xFF0000) as shown in FIG. 7. Between the Red point to the Black point (K), the Red ink is rapidly decreased while the Magenta and Yellow inks of lower lightness are used in larger amounts.

Figure 8:
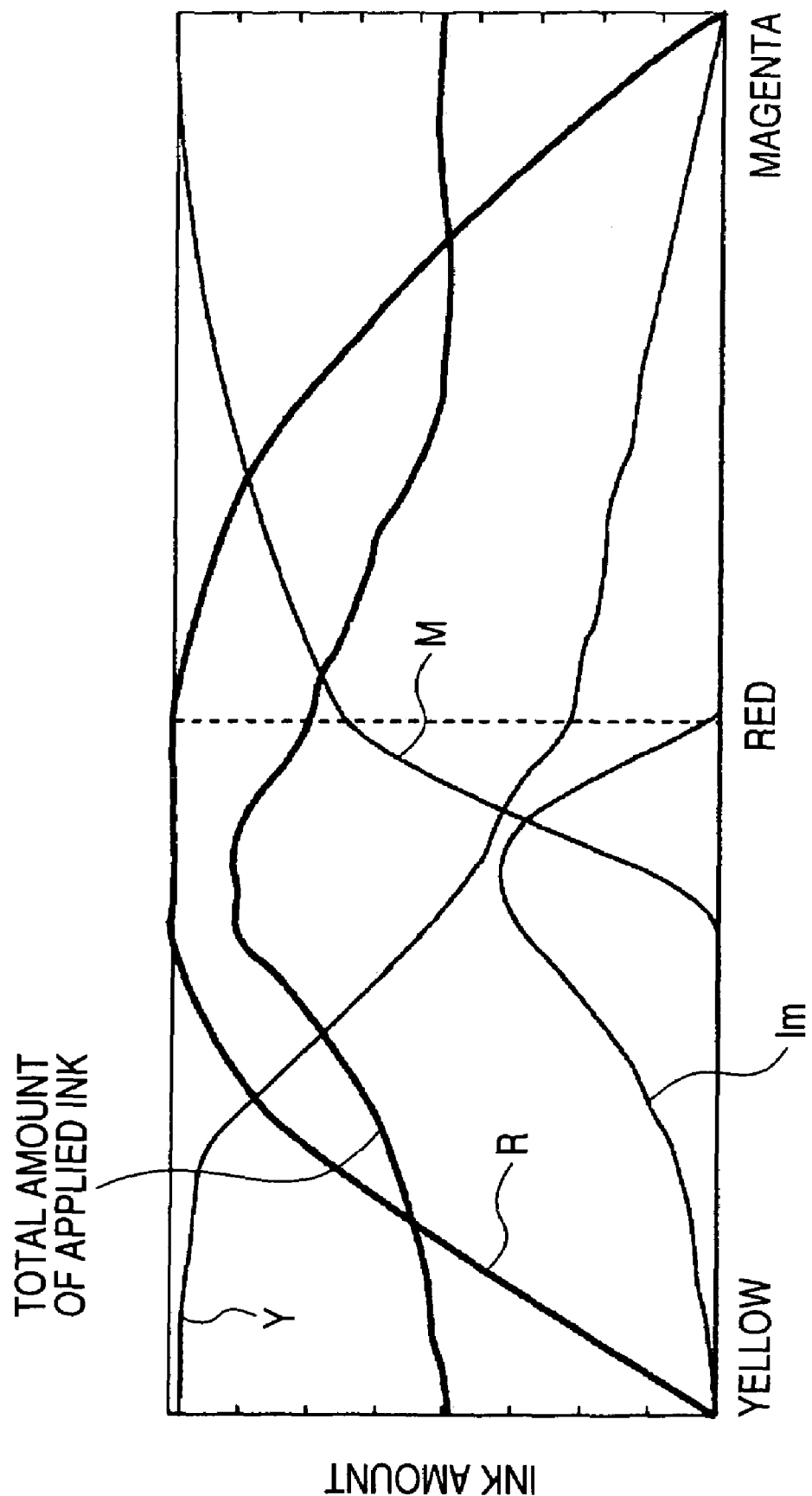
FIG. 8 is a chart showing color separation data of lattice point data on a yellow-red-magenta line in the color separation LUT of the first embodiment.

Also on the Y-R-M line, as shown in FIG. 8, the Red ink is increased from the Yellow point (RGB=0xFFFF00) toward the Red point where the color developing effect of the Red ink is expected, while the Red ink is decreased from such Red point toward the Magenta point (RGB=0xFF00FF). Thus, as shown in FIG. 5, there can be constructed a color separation table capable of expanding the color reproduction range as indicated by broken lines, in comparison with the color reproduction of the conventional non-specific color system indicated by solid lines, in the hue range Y-Rs-R on the a*b* plane.

[Color Separation in Area Where Green Ink is Used]

In the following there will be explained a color separation in case the Green ink, featuring the invention, is used in a larger amount than other color inks (including Red, Cyan, Magenta and Yellow inks). The Green ink is used in a tetragonal pyramidal area WYGC-K, shown in FIG. 4, defined by a line W(RGB=0xFFFFFF)-G(RGB=0x00FF00)-K (0x000000), a line Y(RGB=0xFFFF00)-G (RGB=0x00FF00)-C(0x00FFFF) and interpolations of these lines.

Figure 9:
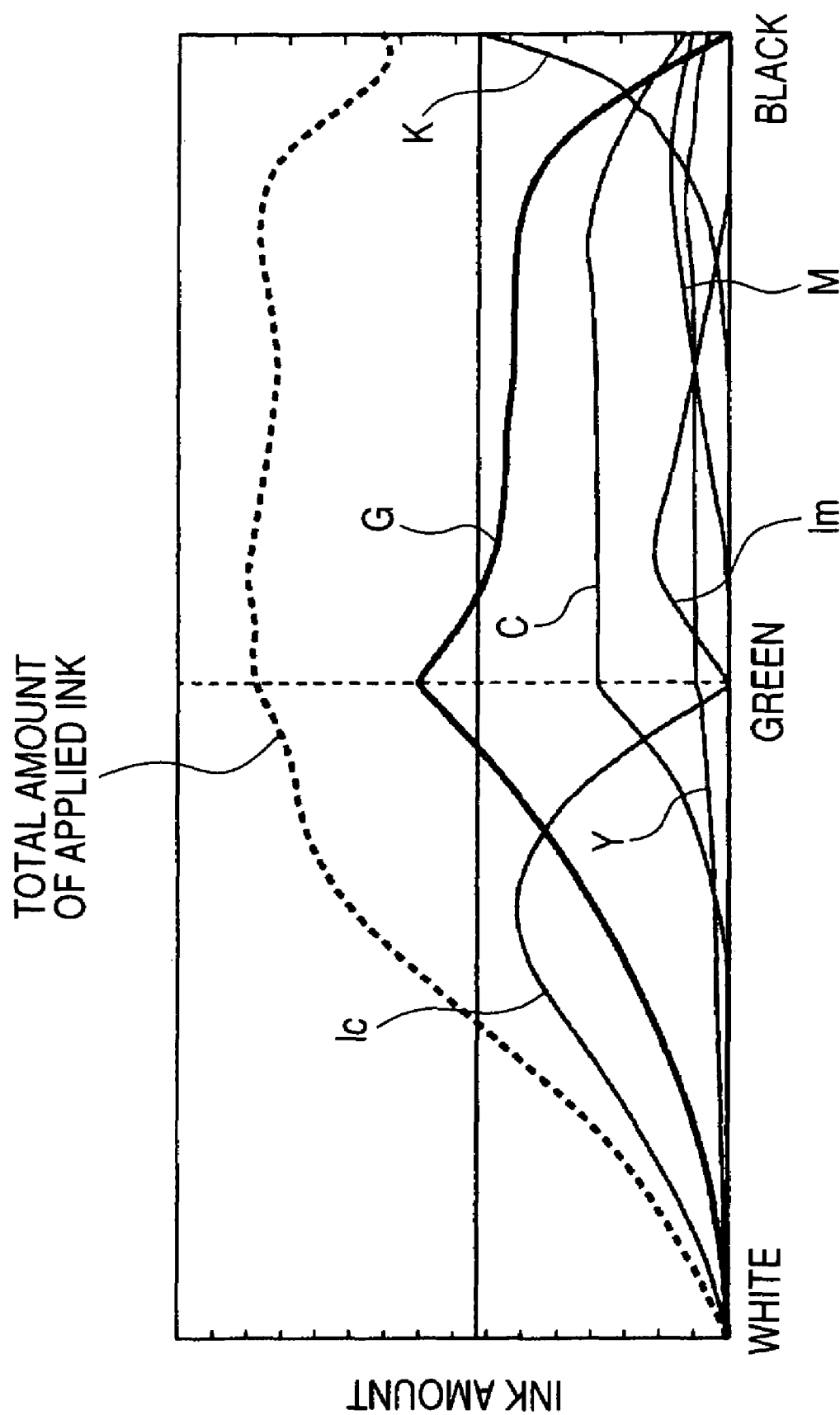
FIG. 9 is a chart showing color separation data of lattice point data on a white-green-black line in the color separation LUT of the first embodiment.

On the W-G-K line, in order to exploit the high chroma of the Green ink, the Green ink is increased progressively, as shown in FIG. 9, from the white point (W) toward the Green point (RGB=0x00FF00), exceeding a maximum application amount of a single color, for example for the Red ink, but within an ink receiving capacity (total application amount) determined by the recording paper and the recording speed, while the Green ink is decreased from the Green point to the Black point (K). The application amount of the Green ink around the GREEN point in FIG. 9, different from the Red ink at the R point in FIG. 7, shows a peak at about the GREEN point, because the upper limit of the total application amount is reached in the G-K range by the addition of the complementary colors lm, M and K inks so that the Green ink is decreased in a darker area beyond the GREEN point. It will be understood that the Green ink is used in an application amount in excess of the maximum application amount for other color inks, indicated by a horizontal line in FIGS. 9 and 10. Also the maximum application amount shown in FIGS. 7 and 8 corresponds to the application amount indicated by a horizontal line in FIGS. 9 and 10.

Figure 14:
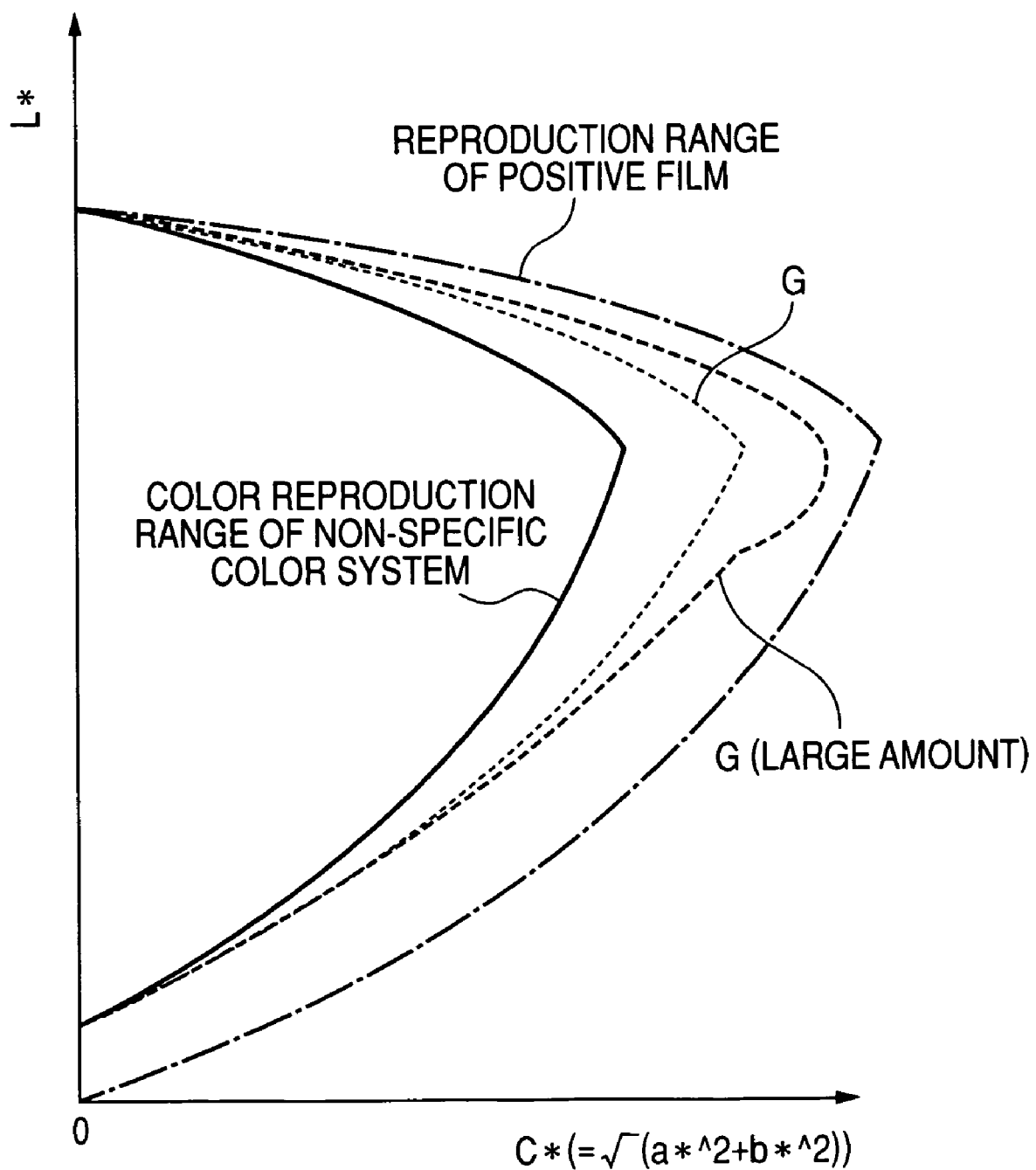
FIG. 14 is a schematic comparison chart showing, on a lightness (L*)-chroma (C*) plane, and on a white-green-K line, a color reproduction range (fine solid line) reproduced by the color separation in the non-specific color system, a reproduction range (chain line) of a positive film in a corresponding hue, a color reproduction range in case a specific color ink of the invention applied in an amount in excess of an application amount recordable with other colors (thick broken line), and a color reproduction range (fine broken line) of a prior specific color ink with an application amount recordable in other colors.

In case the maximum application amount of the Green ink is increased in excess of that for other color inks, the color reproduction range assumes a formed of "G (large amount)"

in FIG. 14 and is expanded around the primary point in comparison with the color reproduction range where the application amount of the Green ink is selected as that of other color inks (namely the color reproduction range "G" in FIG. 14), thus approaching closer to the reproduction range of the positive film. Therefore, in case still a margin exists to the total application amount, the Green ink need not necessarily be used in a peaked shape as in the GREEN point in FIG. 9 but may be used in a constant amount beyond the GREEN point, as in the case of the Red ink shown in FIG. 7.

Figure 10:
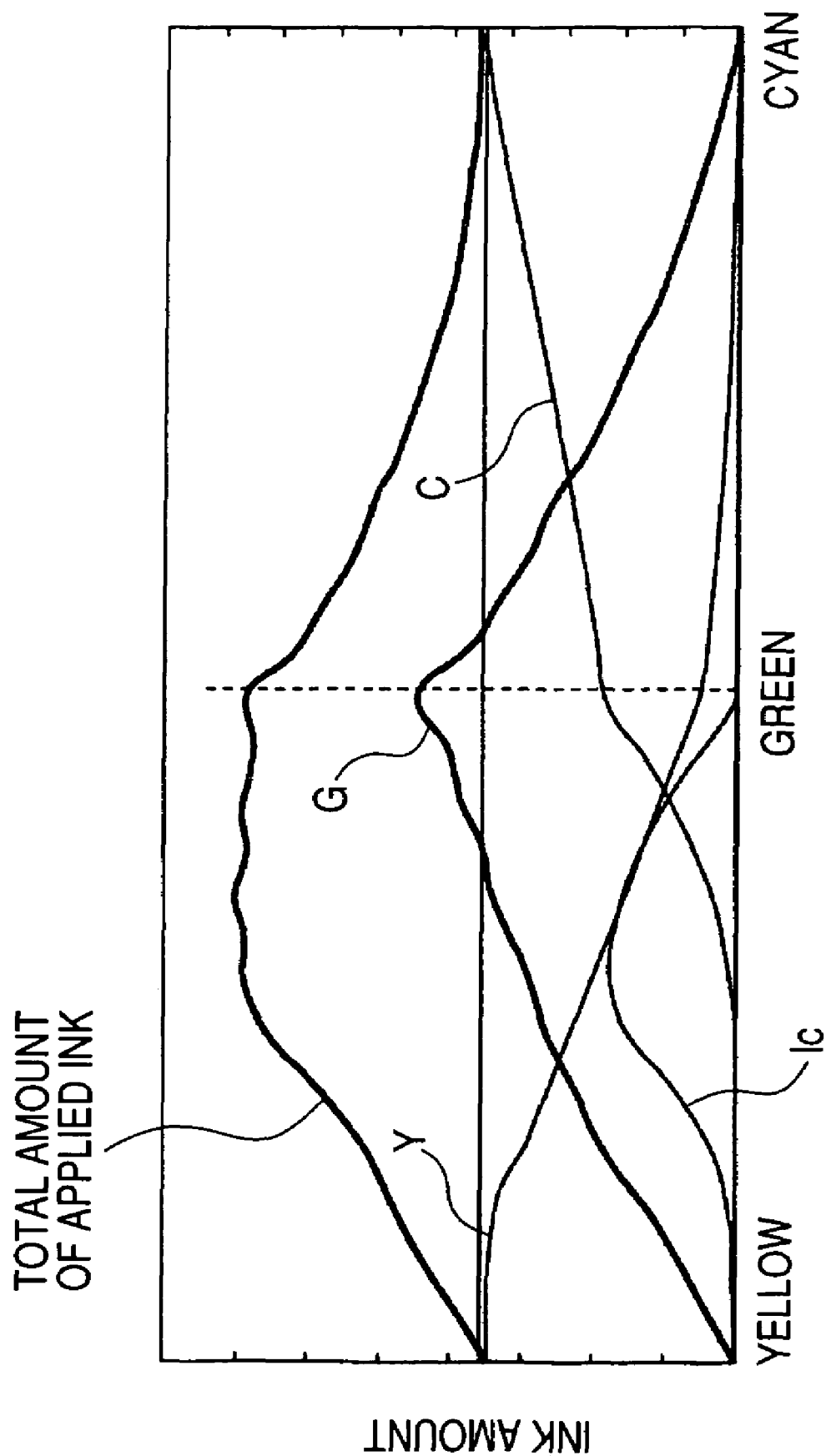
FIG. 10 is a chart showing color separation data of lattice point data on a yellow-green-cyan line in the color separation LUT of the first embodiment.
Figure 11:
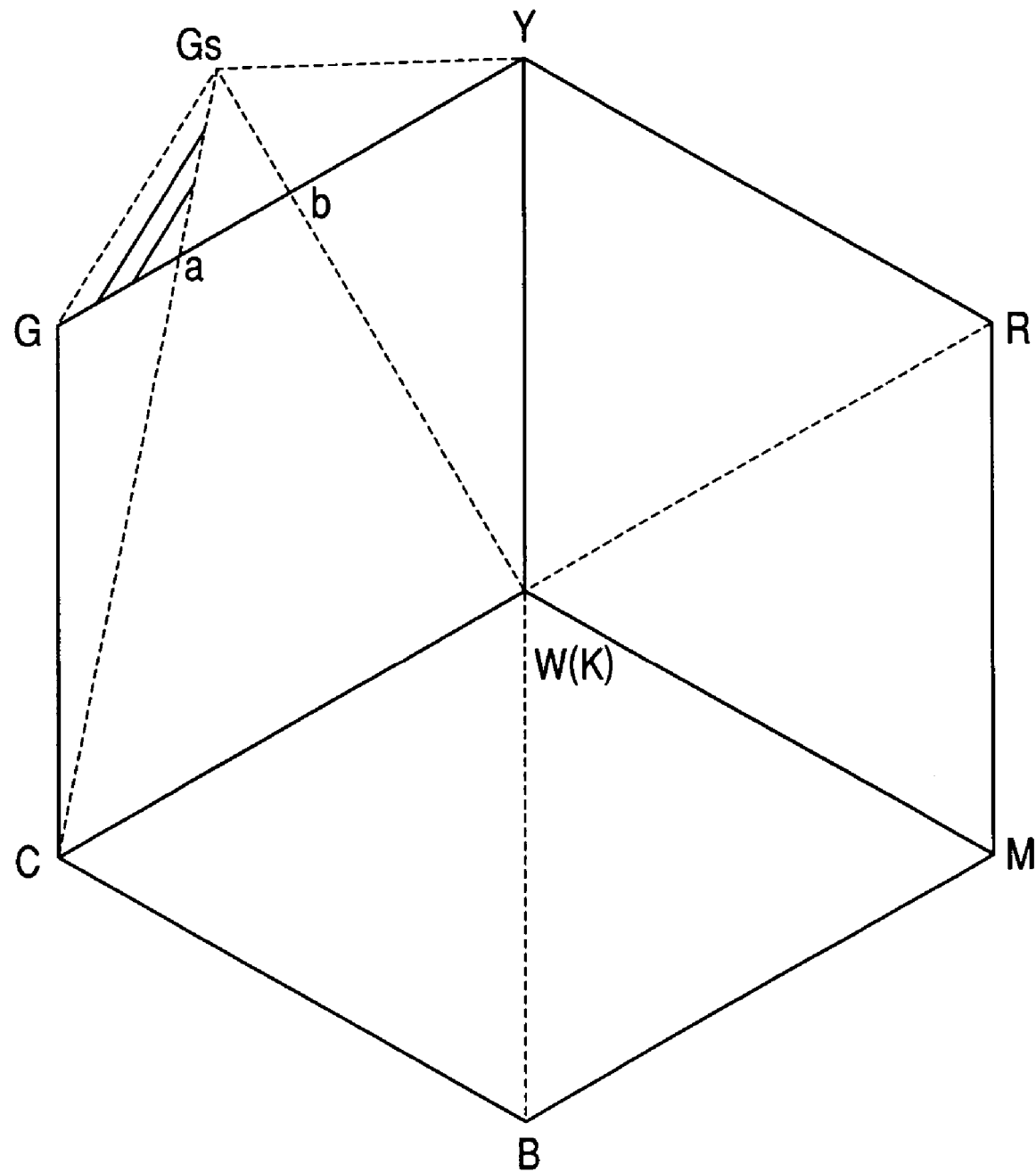
FIG. 11 is a schematic view showing, on a plane of lightness L* and chroma C* in an L*a*b* space, a difference in case of constituting a hue G of primary color shown in FIG. 5 singly with the green ink of specific color and with a secondary color by cyan and yellow inks.

Also FIGS. 9 and 10 indicate that, in the color space indicated by the tetragonal pyramidal region WYGC-K shown in FIG. 4, Cyan and Yellow inks are used in addition to the Green ink at the GREEN point having the highest chroma in the Green area, because of the following reason. As will be apparent from FIG. 5, the Green ink employed in the present embodiment has a hue which is deviated from the hue G toward the hue Y. Therefore, the Green ink, if employed singly for recording the GREEN point, can represent a region defined by W-CGsY in FIG. 11, but becomes incapable of representing a partial area (surrounded by GCa in FIG. 11) within the region representable with the conventional non-specific color system (region defined by W-CGY in FIG. 11), whereby a color reproduction exceeding that of the conventional non-specific color system cannot be realized over the essentially entire color space. Therefore, the present embodiment utilizes the Cyan and Yellow inks in addition to the Green ink at the GREEN point of highest chroma, thereby shifting the hue of a maximum green chroma point Gs (Gs being a maximum chroma point between G and Y in an area W(K)GGsY on an a*b* plane which is a section of the color reproduction range cut along a predetermined lightness L* in the L*a*b* space) from the hue G and thus enabling a presentation of the region surrounded by GCa in FIG. 11. However, in case the Green ink has such a property that can realize a sufficient color reproduction range in comparison with the color reproduction range of the conventional non-specific color system, the C and Y inks need not necessarily be used at the GREEN point, and, in such case, a margin still exists in the application amount at the GREEN point so that a still wider color reproduction range can be realized.

As the Green ink employed in the present embodiment has a lower expanding effect for the color reproduction range in a high lightness area in comparison with the Red ink, Light Cyan ink and Yellow ink are used in large amounts in addition to the Green ink, in the high lightness area of the W-G region. However, in case the Green ink has such color reproducing property as to provide a sufficient color range expanding effect in the high lightness area, the lc and Y inks need not be used in such large amounts but may be used starting from a point somewhat lighter than the GREEN point.

Also on the Y-G-C line, the Green ink is used in a large amount from the Yellow point (RGB=0xFFFF00) toward the Green point where the color developing effect of the Green ink is expected, and is decreased from the Green point toward the Cyan point (RGB=0x00FFFF). In this manner there can be constructed a color separation table that can expand the color range, in the hue range Y-Gs-C on the a*b* plane shown in FIG. 5, as indicated by a broken line in contrast to the color reproduction with the conventional non-specific color system indicated by a solid line.

In this manner, an LUT to be employed in the post-stage process J0003 explained in FIG. 3 can be obtained by interpolating the lattice point data, obtained respectively for the predetermined hues, thereby determining the lattice point data (color separation data) for other lattice points.

In the present embodiment, the specific color ink is not used as a complementary color for the basic colors, but the present invention is easily applicable also to a system in which a specific color is used as a complementary color.

(Halftone Process Section)

In the following, there will be explained the halftone process section J0005. In the following description, a minimum unit to be subjected to an image process for processing multi-value data represented by plural bits will be called a pixel, and data corresponding to such pixel will be called pixel data. The image process for multi-value data represented by plural bits includes, in FIG. 3, the post-stage process which converts 8-bit RGB data into 8-bit data of each of CMYKlclmRG corresponding to the ink colors to be used in the printer, and the halftone process for quantizing 8-bit CMYKlclmRG data into 4-bit CMYKlclmRG data. Stated differently, a "pixel" means a minimum unit capable of a gradational presentation, having gradation information of plural bits.

The halftone process section J0005 of the present embodiments converts multi-value density information (8-bit data) of CMYKlclmRG having 256 levels into gradation information (4-bit) of 9 levels for CMYKlclmR and into gradation information (4-bit data) of 16 levels for G, but, for the purpose of simplicity in the following description, there will only be explained a case of converting the multi-value density information (8-bit data) of 256 levels into gradation information (4-bit data) of 9 values.

Figure 15:
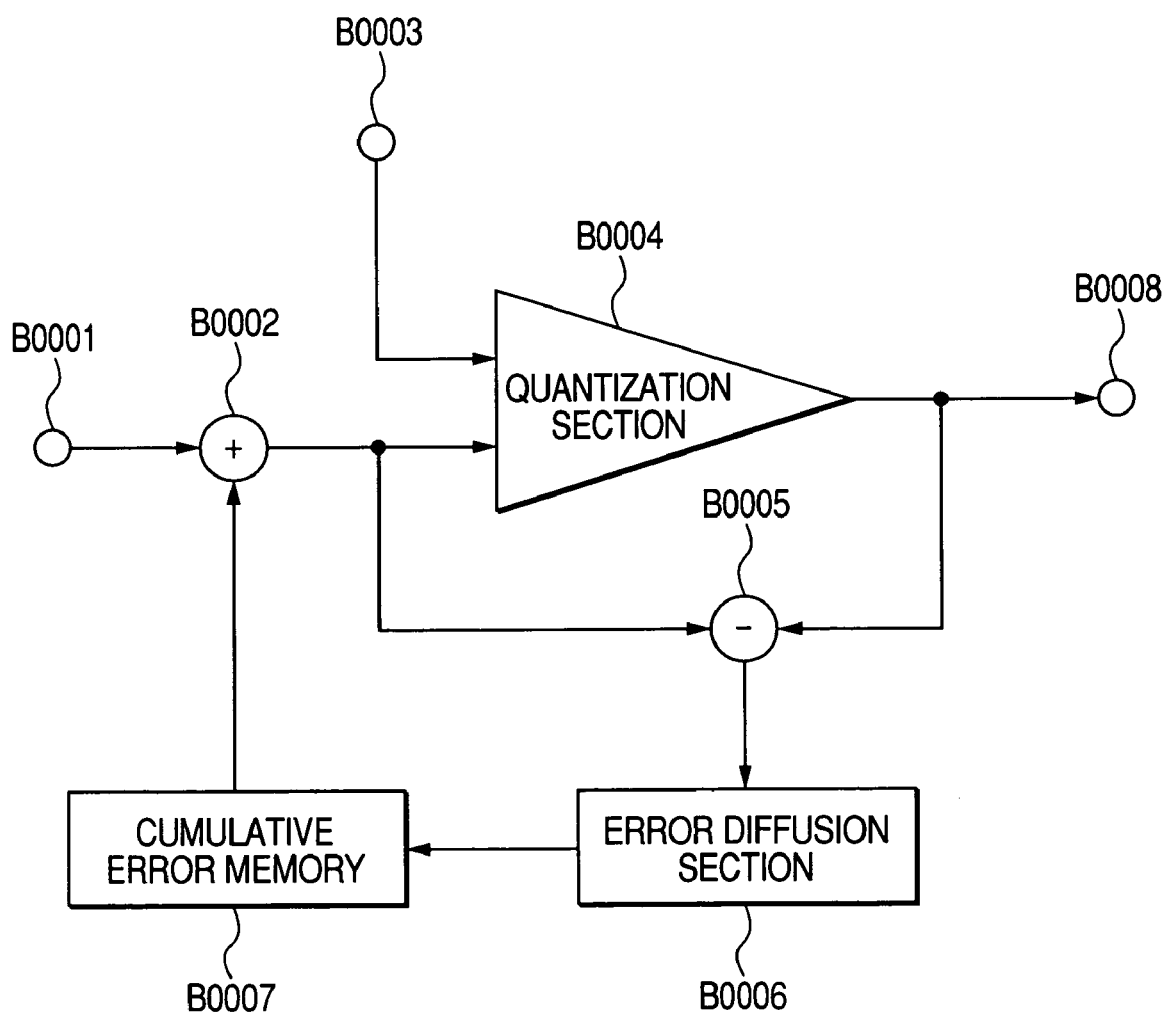
FIG. 15 is a block diagram of a halftone process part in a first embodiment of the present invention.

FIG. 15 is a block diagram showing a configuration of a halftone process section applicable to the embodiment of the present invention. In FIG. 15, there are illustrated an input terminal B0001 for pixel data, a cumulative error adder B0002, a terminal B0003 for setting a quantizing threshold value in case of converting input pixel data into two or more numbers of gradation levels, a quantization section B0004, an error calculation section B0005 for calculating a quantization error, an error diffusion section B0006 for diffusing the quantization error, a cumulative error memory B0007 for storing a cumulative error, and an output terminal B0008 for pixel data formed by a series of processes.

The input terminal B0001 of the halftone process section receives, in succession, pixel data of the pixels selected from an entire image by an image scanning section to be explained later. The halftone process section sequentially processes the entered individual pixel data, and outputs pixel by pixel from the output terminal B0008.

Figure 17:
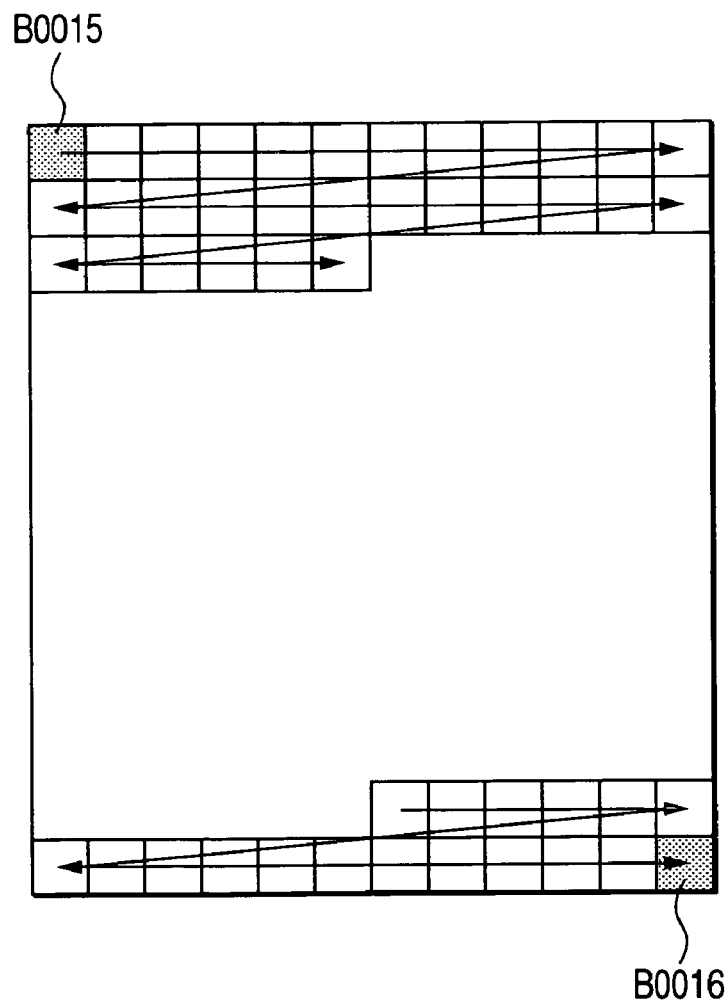
FIG. 17 is a view showing details of an image scanning.

FIG. 17 shows a mode of scan process executed by the image scanning section. The image scanning section selects pixels to be processed, one by one, from image data constituted of an array of plural pixels, and enters the pixel data into the input terminal B0001 of the halftone process section. In FIG. 17, each square represents each pixel, and B0015 indicates a pixel positioned at the upper left corner of the image while B0016 indicates a pixel positioned at the lower right corner of the image.

The image scan process is initiated by designating the pixel B0015, at the upper left corner of the image, as a selected pixel (hereinafter also called target pixel), and the process proceeds by switching the target pixel one by one toward right as indicated by an arrow. When the process reaches the right-hand end of the uppermost row, the target pixel is shifted to a pixel at the left-hand end in a one-step lower pixel row. The scanning process proceeds in such order indicated by the arrow, and the scan process is completed when it reaches the last pixel B0016 at the lower right corner.

Figure 16:
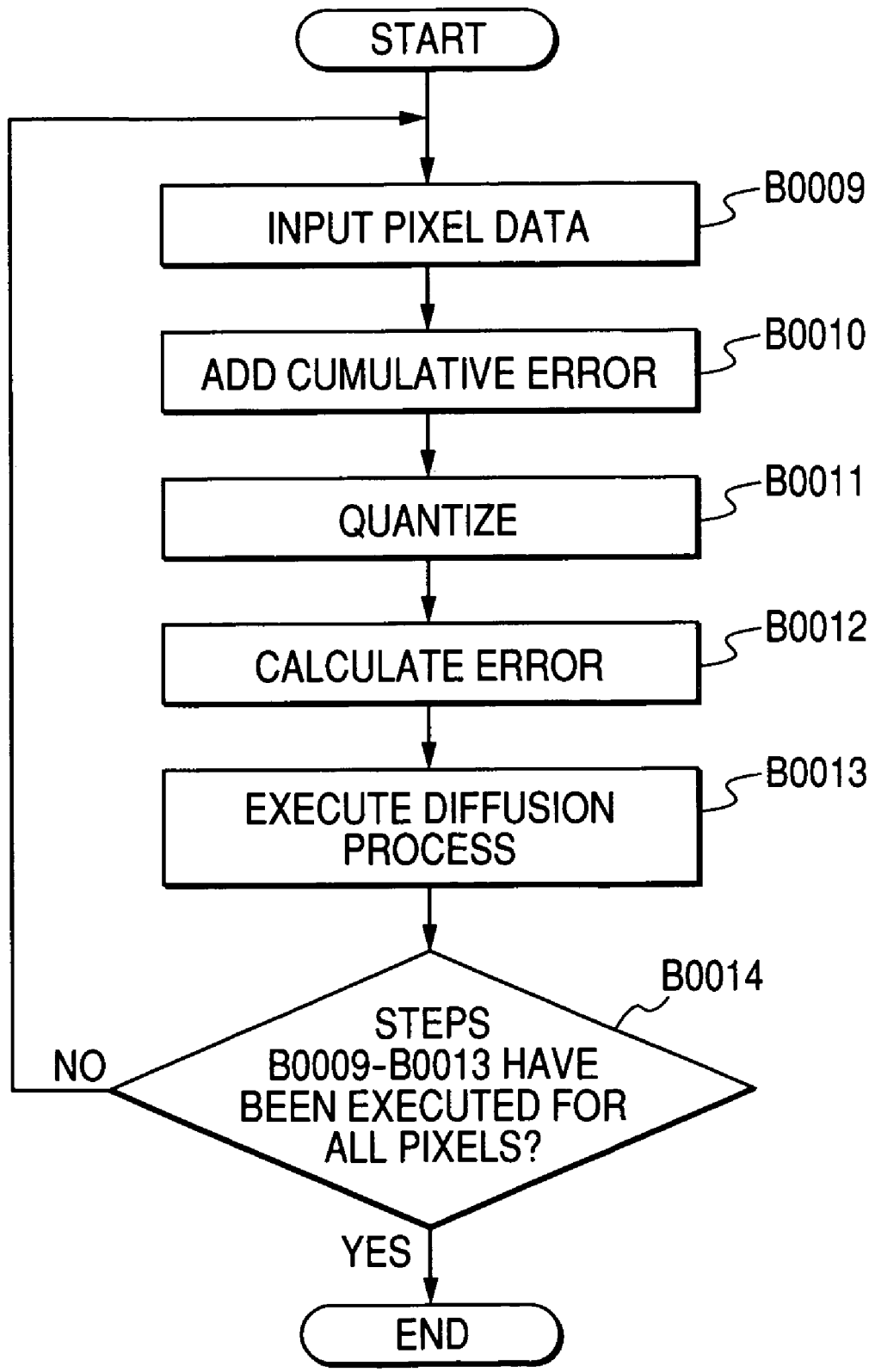
FIG. 16 is a flow chart showing functions of a halftone process portion.

FIG. 16 is a flow chart showing operations conducted by the halftone process section shown in FIG. 15.

When the process is initiated, image data to be processed are entered from the image scanning section (step B0009).

Then the cumulative error adding section B0002 adds, to the entered pixel data, a cumulative error value corresponding to the pixel position and stored in the cumulative error memory B0007 (step B0010).

Figure 18:
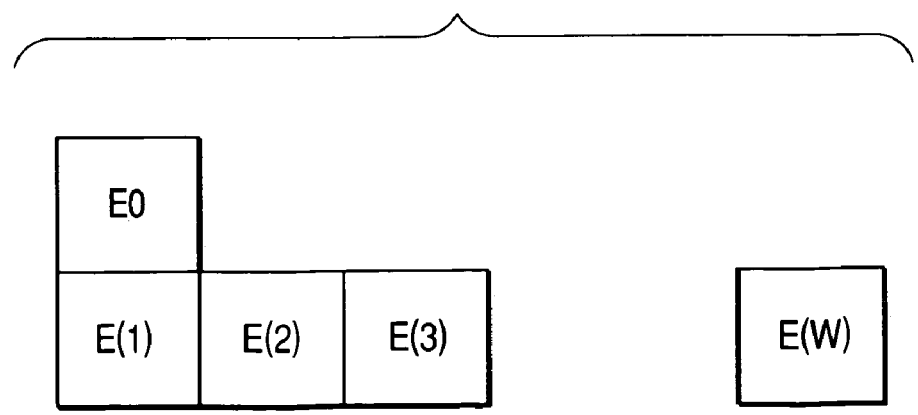
FIG. 18 is a view showing details of a cumulative error memory.

FIG. 18 shows data and data storage format in the cumulative error memory B0007. The cumulative error memory B0007 has a memory area E0 and W memory areas E(x) (x being an integer of 1 to W). W indicates a sequential number of pixels in the horizontal direction, for the image data to be processed. Each memory area stores a quantization error E(x) to be applied to the target pixel. The quantization error is obtained by a method to be explained later, and is initialized, at the start of the process, to an initial value 0 in all the areas.

In the step B0010, the cumulative error adding section B0002 adds, to the entered pixel data, a value of the error memory E(x) in a position x ($0 < x \leq W$) corresponding to the pixel in the lateral direction. Thus, the pixel data I entered to the input terminal B0001 and the pixel data I' after the addition of the cumulative error in the step B0010 are correlated by:

$$I' = I + E(x).$$

A subsequent step B0011 executes a quantization process by comparing the pixel data I' after the addition of the cumulative error with a threshold value entered from the threshold value setting terminal B0003. In the present embodiment, the pixel data I' after the addition of the cumulative error are compared with 8 threshold values to assign the image data after quantization into 9 levels thereby determining a value of the output pixel data to be supplied to the output terminal B0008. More specifically, in response to the pixel data entered from the cumulative error adding section B0002 and having an integral value within a range of 0 to 255, an output gradation level O is determined by following equations:

$$O = 0 \quad (I' < 16) \qquad \text{(equation 1)}$$

$$O = 32 \quad (16 \leq I' < 48) \qquad \text{(equation 2)}$$

$$O = 64 \quad (48 \leq I' < 80) \qquad \text{(equation 3)}$$

$$O = 96 \quad (80 \leq I' < 112) \qquad \text{(equation 4)}$$

$$O = 128 \quad (112 \leq I' < 144) \qquad \text{(equation 5)}$$

$$O = 160 \quad (144 \leq I' < 176) \qquad \text{(equation 6)}$$

$$O = 192 \quad (176 \leq I' < 208) \qquad \text{(equation 7)}$$

$$O = 224 \quad (208 \leq I' < 240) \qquad \text{(equation 8)}$$

$$O = 255 \quad (240 \leq I') \qquad \text{(equation 9)}$$

For the convenience of explanation, each output gradation level O is given following name: level 0 for O=0, level 1 for O=32, level 2 for O=64, level 3 for O=96, level 4 for O=128, level 5 for O=160, level 6 for O=192, level 7 for O=224, and level 8 for O=255.

Then the error calculation section B0005 calculates a quantization error E which is a difference between the pixel data I' after the addition of the cumulative error and the output pixel value O (step B0012):

$$E = I' - O \qquad \text{(equation 10)}.$$

Then in a step B0013, the error diffusion section B0006 executes an error diffusion process according to a lateral position x of the target pixel. More specifically, it calculates the quantization errors to be stored in the memory areas E0 and E(x) according to the following equations and stores them in the cumulative error memory:

$$E(x+1) \leftarrow E(x+1) + E \times 7/16 \quad (x < W) \qquad \text{(equation 11)}$$

$$E(x-1) \leftarrow E(x-1) + E \times 3/16 \quad (x > 1) \qquad \text{(equation 12)}$$

$$E(x) \leftarrow E0 + E \times 5/16 \quad (1 < x < W) \qquad \text{(equation 13)}$$

$$E(x) \leftarrow E0 + E \times 8/16 \quad (x = 1) \qquad \text{(equation 14)}$$

$$E(x) \leftarrow E0 + E \times 13/16 \quad (x = W) \qquad \text{(equation 15)}$$

$$E0 \leftarrow E \times 1/16 \quad (x < W) \qquad \text{(equation 16)}$$

$$E0 \leftarrow 0 \quad (x = W) \qquad \text{(equation 17)}.$$

Thus an error diffusion process for a pixel entered in the input terminal B0001 is completed.

A step B0014 discriminates whether the processes of the steps B0009-B0013 have been applied to all the pixels in the image. More specifically, there is discriminated whether the pixel selected by the image scanning section has reached B0016 in FIG. 17, and, if B0016 has not been reached, the target pixel is advanced by one pixel in the direction of the arrow and the sequence returns to the step B0009.

In case it is judged that all the pixels have been processed, the halftone process of the present embodiment is completed.

In the present embodiment, the above-described process is executed for each ink color.

Figure 20:
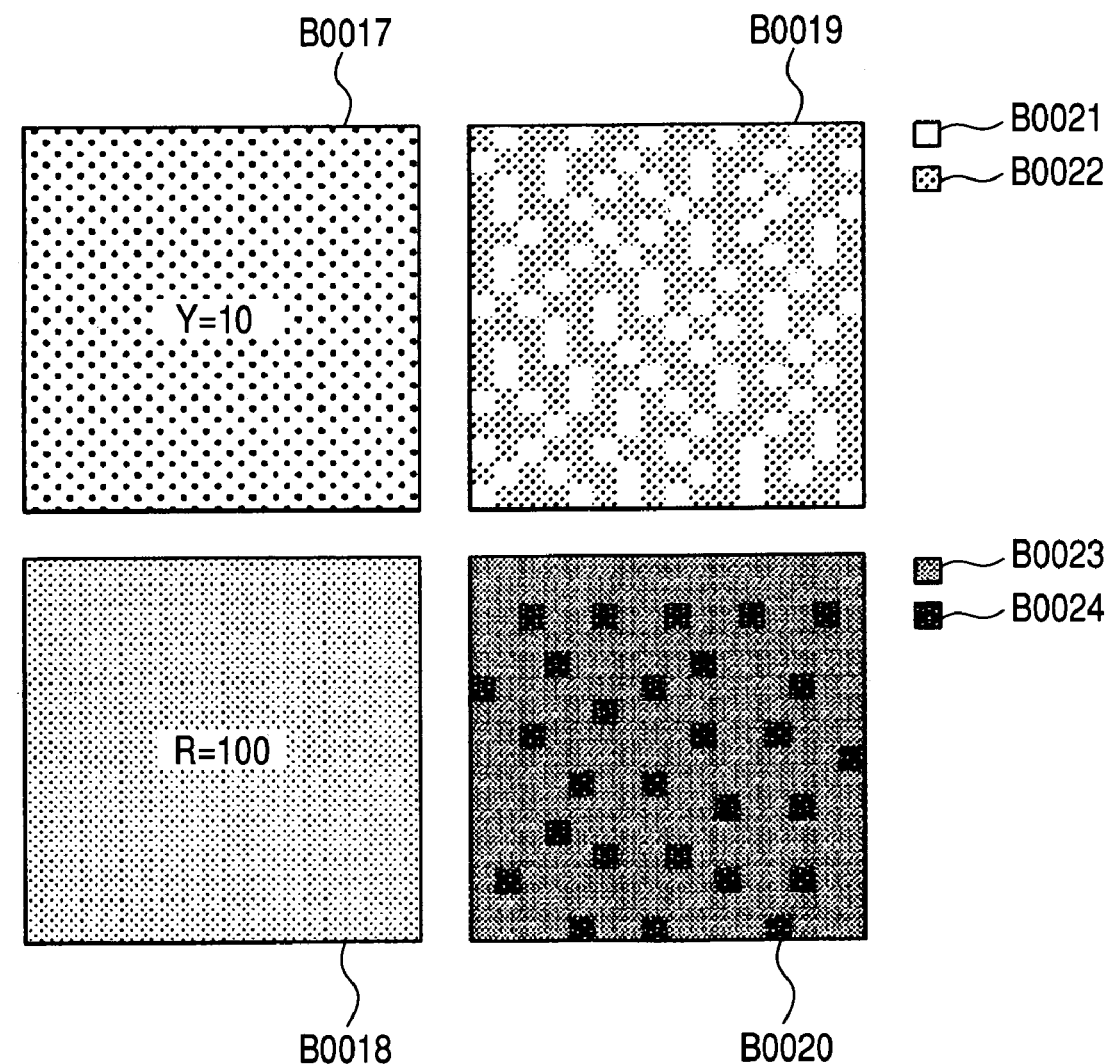
FIG. 20 is a view showing examples of an image having a predetermined number of gradation levels prior to a halftone process and quantized images after the halftone process.

FIG. 20 shows examples of an image prior to the halftone process, having predetermined gradation values, and a quantized image after the halftone process. In FIG. 20, image data B0019 corresponds to image data B0017 prepared for yellow (Y) color, subjected to halftone process, and image data B0020 corresponds to image data B0018 prepared for the specific red color ink (R), subjected to halftone process.

In the image B0017, pixel data are 10 in all the pixels. On the other hand, in the image B0019 after the halftone process, pixels of two levels (densities), namely B0021 having O=0 (level 0) and B0022 having O=32 (level 1) are present in a uniformly dispersed state.

In the image B0018, pixel data are 100 in all the pixels. On the other hand, in the image B0020 after the halftone process, pixels of two levels (densities), namely B0023 having O=96 (level 4) and B0024 having O=128 (level 5) are present in a uniformly dispersed state.

In either case, the pixel data of a same level in all the pixels in the original image are changed, after the halftone process, to the dispersed pixels of plural levels, wherein the data value at the input is maintained in the entire image.

(Generation of Print Data)

In the following, the print data generation process J0006 will be explained.

The image data subjected to the halftone process are then formed into a following format, thereby generating print data to be actually entered into a recording apparatus.

Figure 19:
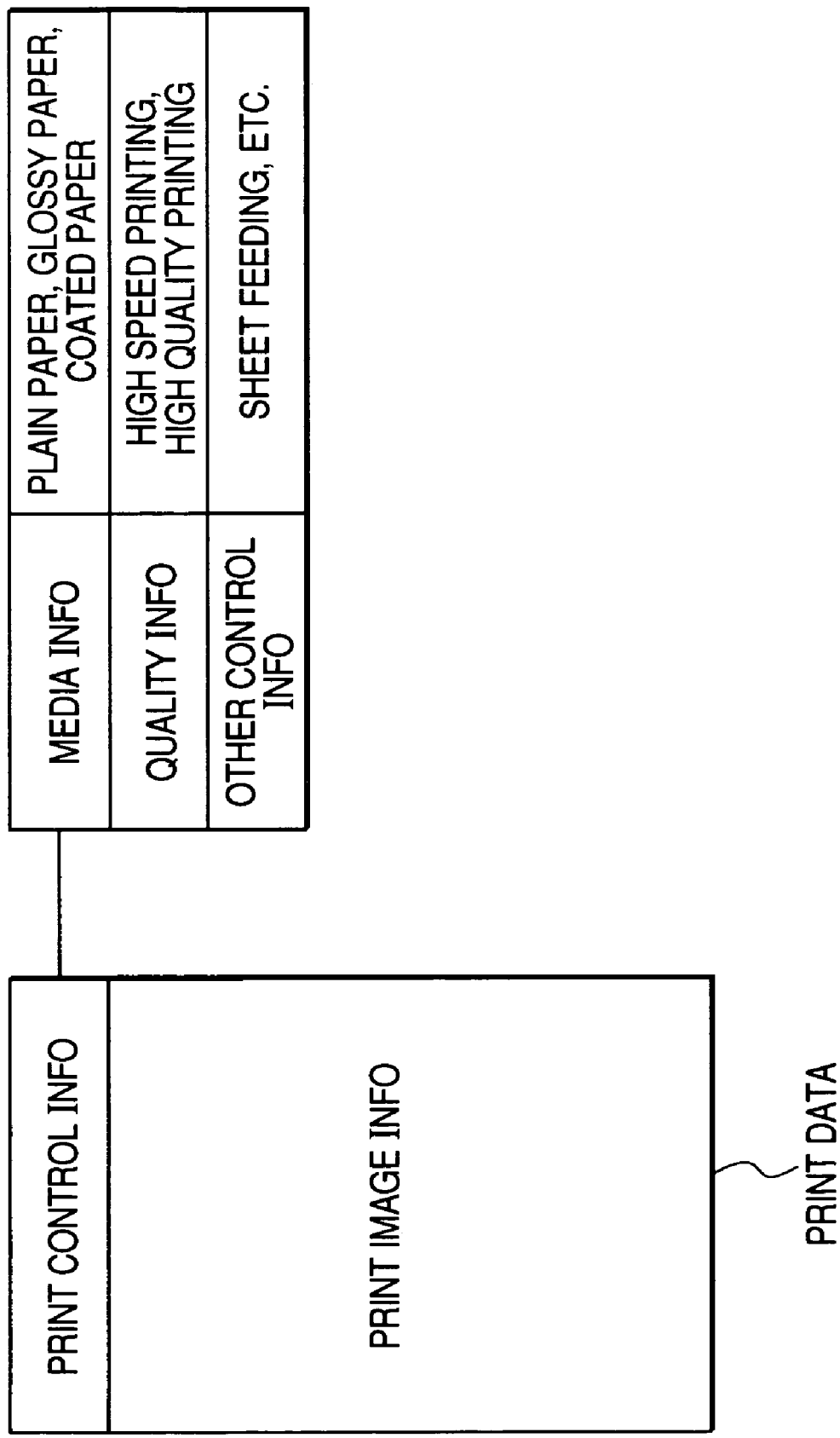
FIG. 19 is a view showing configuration of print data constituted of print control information for controlling printing and print image information (print image data)

FIG. 19 shows the structure of the print data. As shown in FIG. 19, the print data are constituted of print control information for controlling the printing operation, and print image information (also called print image data). The print control information is further constituted of "media information" for recording image, "quality information" of the print, and "other control information" for example for a sheet feeding method.

The media information describes a type of paper for recording, and defines a type of paper among a plain paper, a glossy paper, a coated paper and the like. The quality information described a quality of printing, and defines either a high-speed printing or a high-quality printing. These print control information are formed according to the instructions made by the user on a host PC. Also the print image information (print image data) describes the image data generated by the aforementioned halftone process. The print data thus formed by the halftone process are then supplied to a dot placement patterning process in the main body of the recording apparatus.

The halftone process and the generation of the print data have been explained in such a manner that these processes are executed not in the main body of the recording apparatus but by a printer driver installed in a host apparatus, but the present embodiment is not limited to such case. The effects of the present invention can be obtained in the same manner even in a configuration where the halftone process itself is executed within the recording apparatus.

(Dot Placement Patterning Process)

In the following, the dot placement patterning process J0007 will be explained.

In the aforementioned halftone process, the CMYKlclmRG multi-value density information (8-bit data) of 256 levels is subjected to a decrease of the number of levels to the gradation information (4-bit data) of 9 levels (CMYKlclmR) and 16 levels (G). However, the information that can be recorded by the ink jet recording apparatus of the present embodiment is binary information whether or not to execute recording with ink. The dot placement patterning process executes a function of reducing the multiple levels 0-8 (CMYKlclmR) or multiple levels 0-15 (G) to binary levels determining presence or absence of a dot. More specifically, the dot placement patterning process J0007 assigns, to each pixel represented by the 4-bit data of levels 0-8 or levels 0-15 outputted from the halftone process section, a dot placement pattern corresponding to the gradation value (level 0-8 or 0-15) of such pixel, thereby defining a dot on/off state for each of plural areas within a pixel and arranging a 1-bit discharge data (binary data) of "1" or "0" in each area within a pixel.

Figure 21:
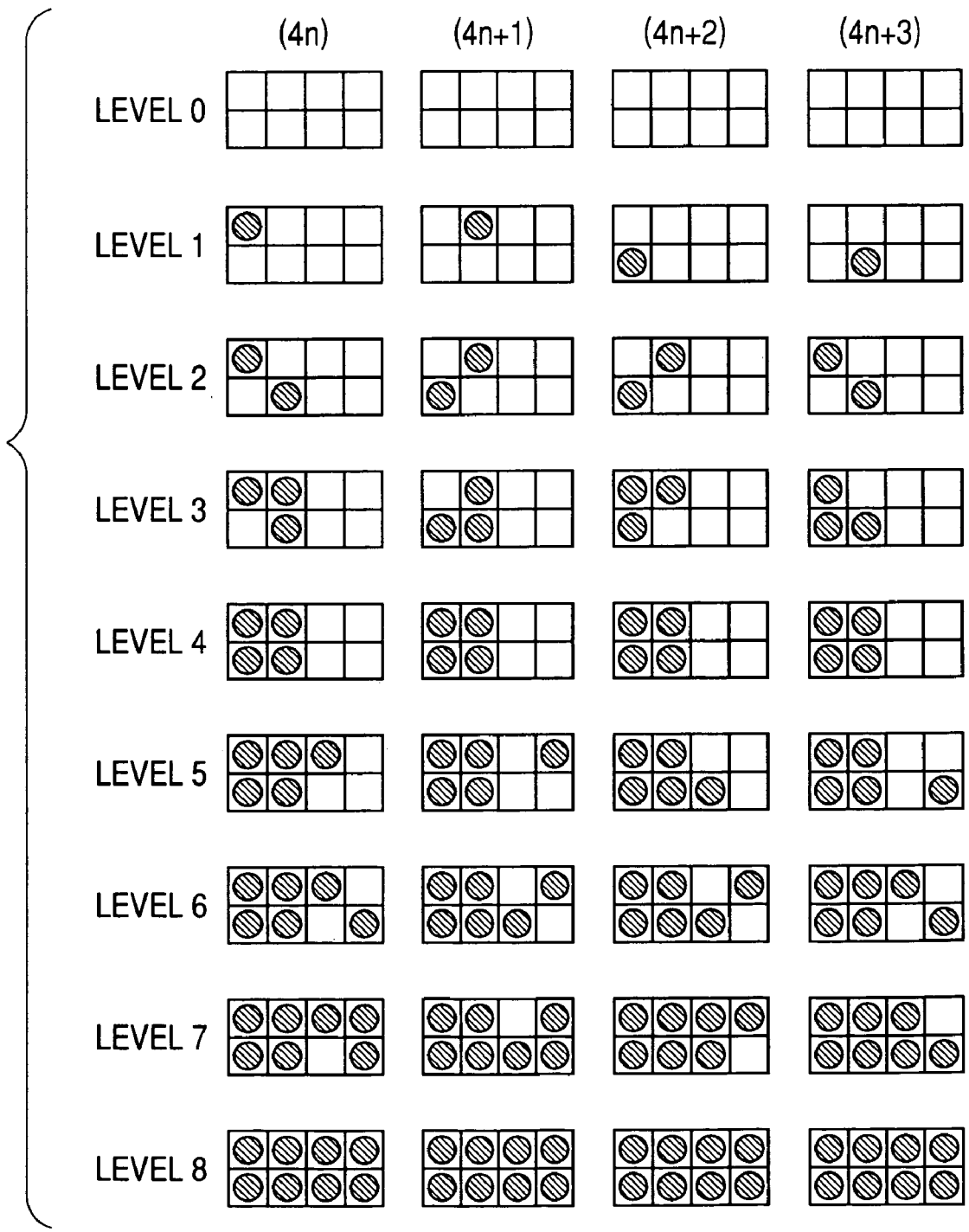
FIG. 21 is a view showing output patterns corresponding to input levels converted by a dot array patterning embodying the invention.

FIG. 21 shows output patterns corresponding to the input levels 0-8 (CMYKlclmR) converted in the dot placement patterning process of the present embodiment. Levels shown at the left side correspond to the level 0 to level 8 outputted from the halftone process section. Each matrix area shown at the right side and constituted of 2 areas in the vertical direction and 4 areas in the horizontal direction (CMYKlclmR) corresponds to a pixel area outputted from the halftone process. Also each area within a pixel corresponds to a minimum unit for which a dot on/off state is defined.

In FIG. 21, an area having a circle mark indicates an area where a dot recording is executed, and the number of recorded dots increases by one as the level number is stepped up. Therefore, for CMYKlclmR, 8 dots are provided at maximum for a pixel. In the present embodiment, the density information of the original image is finally reflected in such form. (4n)-(4n+3), in which n indicates an integer of 1 or larger, indicate a pixel position in the lateral direction from the left-hand end of the input image, and the patterns placed thereunder indicate that mutually different plural patterns are available according to the pixel position even for a same input level. Thus, to a same input level, four dot placement patterns shown by (4n)-(4n+3) are cyclically assigned on the recording medium.

In FIG. 21, the vertical direction is a direction of array of the discharge ports of the recording head, while the horizontal direction is a scanning direction of the recording head. Therefore, a configuration of recording various dot placements even for a same input level provides effects of dispersing the number of times of discharges between a nozzle positioned in the upper row of the dot placement pattern and a nozzle positioned in the lower row of the dot placement pattern, and of dispersing various noises specific to the recording apparatus.

Similarly, for the Green color having 16 levels of level 0-15, there are used unillustrated dot placement pattern matrixes formed by 2 areas in the vertical direction and 8 areas in the horizontal direction. The number of recorded dots increases by one each as the level number is stepped up 0 to 15. Therefore, for G, 16 dots are provided at maximum for a pixel.

In the present embodiment, as explained in the foregoing, a pixel is represented by 8 gradation levels for CMYKlclmR with a maximum applied dot number of 8, and by 16 gradation levels for G, with a maximum applied dot number of 16, whereby a maximum applied amount per unit area (one pixel in this case) is made larger for the green ink than for other color inks.

However, for merely increasing the maximum application amount per unit area (one pixel in this case) for the green ink in comparison with other color inks, it is unnecessary to employ different numbers of levels between the green color and the other colors and there may be adopted a same number of levels. For example, it is possible to adopt 8 gradation levels also for the green color as in other colors and to place dots of a twice number in comparison with other colors in each gradation level. More specifically, for 8 gradation levels of the green color, dot placement patterns with 0, 2, 4, 6, 8, 10, 12, 14 and 16 dots are respectively assigned from the low gradation level side. The present invention also includes such configuration of employing a same number of gradation level for a color for which the maximum application amount is relatively larger (green color in this case) and for colors for which the maximum application amount is relatively smaller (colors other than green in this case). However, if a same number of gradation levels is adopted even for a higher maximum application amount, a density difference between the neighboring gradation levels becomes larger, thereby facilitating generation of a pseudo contour. Therefore, a configuration as in the present embodiment of increasing, for a color having a relatively larger maximum application amount, the number of gradation level in relative manner in comparison with a color having a relatively smaller maximum application amount is suitable for suppressing generation of a pseudo contour and for obtaining a high image quality.

Upon completion of the dot placement patterning process explained above, all the dot placement patterns for the recording medium are determined, and 1-bit discharge data of "1" or "0" for each color are arranged in each area within a pixel. Thereafter, as explained in FIG. 3, the 1-bit discharge data for each color are subjected to a masking process by the mask data conversion process J0008 to generate discharge data of each color for each scan, and the discharge data Y, M, C, K, lc, lm, R and G for each scan are supplied at an appropriate timing to a head drive circuit J0009 whereby a recording head J0010 is driven to discharge the respective inks according to such discharge data.

(Configuration of Recording Head)

In the following a configuration of a head cartridge H1000 employed in the present embodiment will be explained.

A head cartridge H1000 of the present embodiment is provided with a recording head H1001, means which mounts an ink tank H1900 and means which supplies ink from the ink tank H1900 to the recording head, and is detachably mounted on a carriage M4000. A schematic structure of the recording head will be explained with reference to FIGS. 22 and 23 showing a recording head for 7 colors, namely omitting one color for the purpose of clarity, and a nozzle configuration of the recording head will be explained with reference to FIG. 24 showing 8 colors corresponding to the present embodiment.

Figure 22:
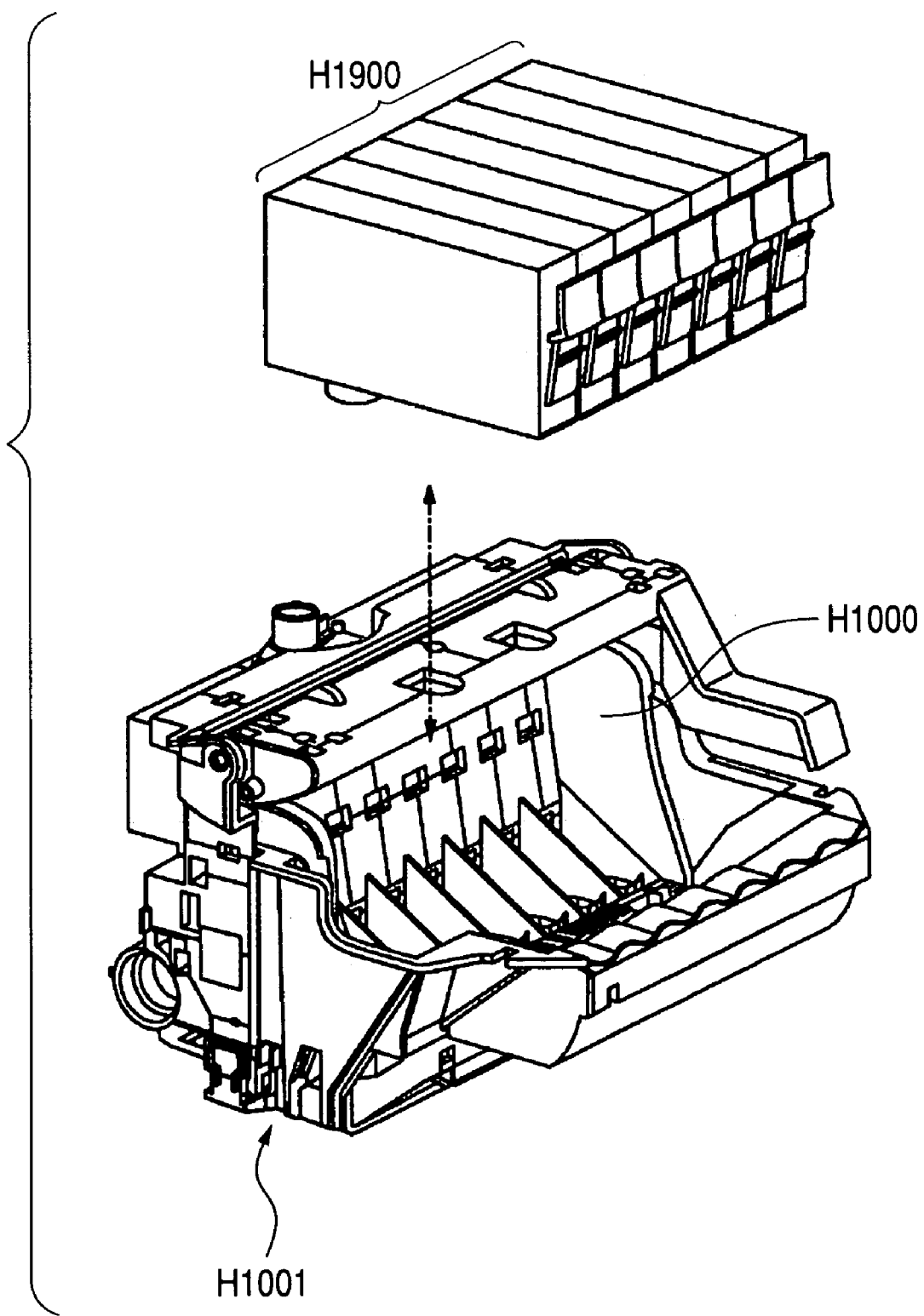
FIG. 22 is a perspective view showing a mounting state of an ink tank in a head cartridge employed in an embodiment of the invention.

FIG. 22 shows a manner of mount of the ink tank H1900 onto the head cartridge H1000 employed in the present embodiment. A recording apparatus of the present embodiment forms an image with inks of 8 colors of light cyan, light magenta, cyan, magenta, yellow, black, red and green, so that the ink tank H1900 is prepared independently for 8 colors. As shown in FIG. 22, each is detachably mounted on the head cartridge H1000. The mounting and detaching of the ink tank H1900 can be achieved in a state where the head cartridge H1000 is mounted on the carriage M4000.

Figure 23:
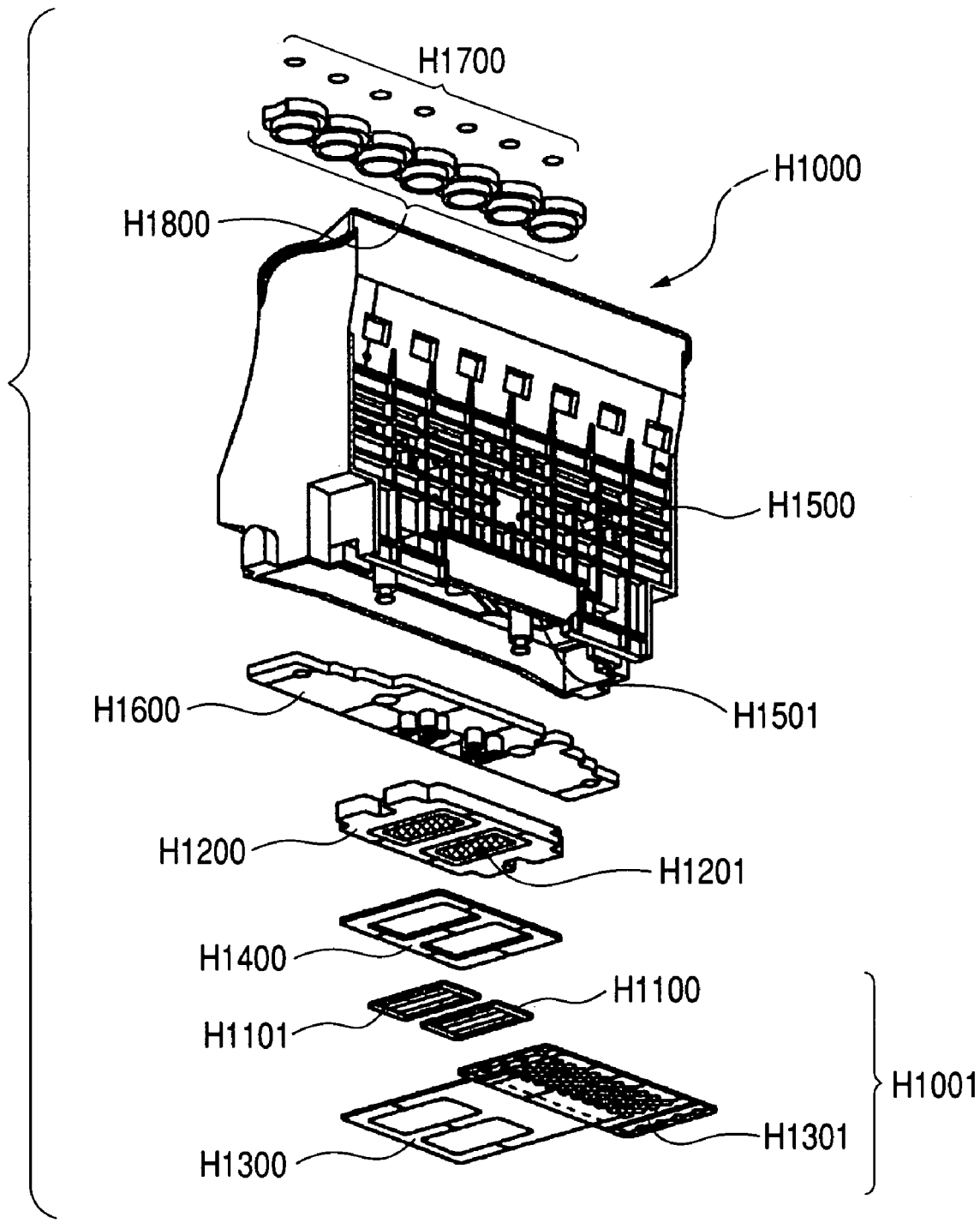
FIG. 23 is an exploded perspective view of a head cartridge employed in the first embodiment of the invention.
Figure 24:
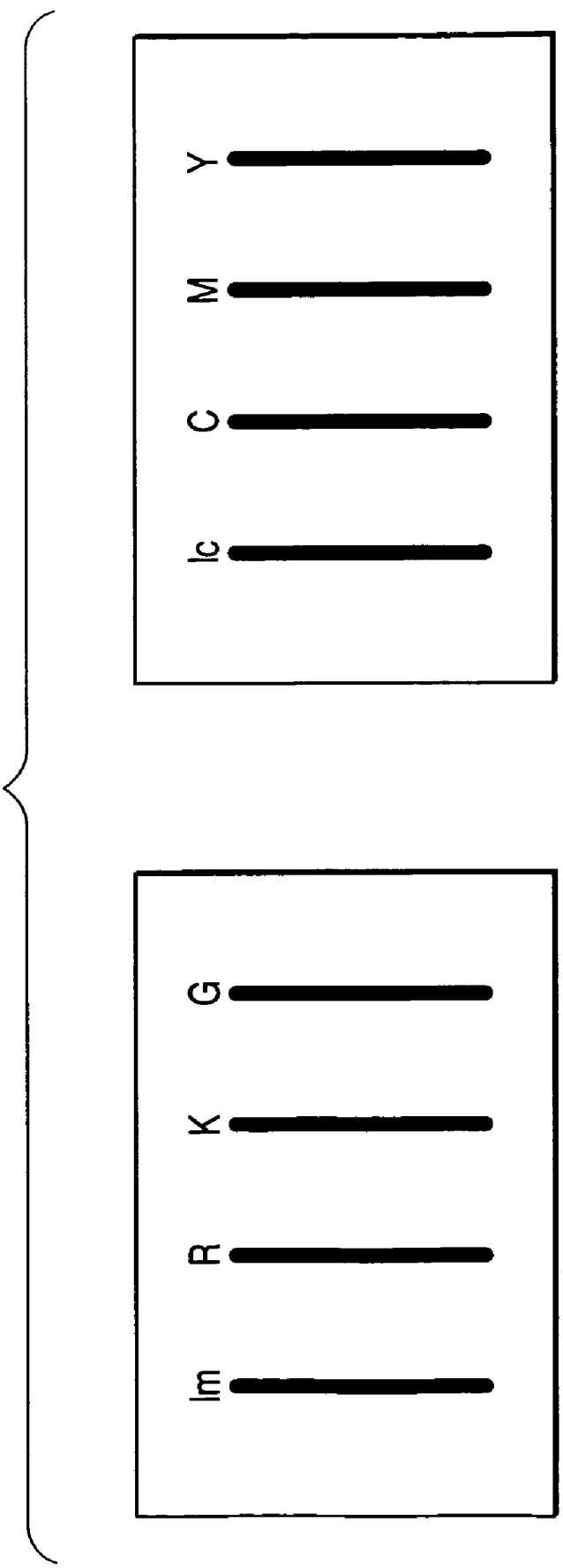
FIG. 24 is an elevation view showing an array of recording nozzles on a recording element substrate in a head cartridge in the first embodiment of the invention.

FIG. 23 is an exploded perspective view of the head cartridge H1000. Referring to FIG. 23, the head cartridge H1000 is constituted for example of a first recording element substrate H1100, a second recording element substrate H1101, a first plate H1200, a second plate H1400, an electric wiring board H1300, a tank holder H1500, a flow path forming member H1600, a filter H1700, and a sealing rubber H1800.

The first recording element substrate H1100 and the second recording element substrate H1101 are silicon substrates, and plural recording elements (nozzles) are formed on a side thereof by a photolithographic method. Electric wirings such as Al for supplying an electric power to each recording element are formed by a film forming technology, and plural ink flow paths respectively corresponding to the recording elements are also formed by a photolithographic method. Further, an ink supply aperture for supplying ink to plural ink flow paths is formed on a rear surface.

FIG. 24 is a magnified elevation view of the first recording element substrate H1100 and the second recording element substrate H1101. Thick solid lines in FIG. 24 respectively indicate arrays of recording elements (also called nozzle arrays) respectively corresponding to the different ink colors, and the first recording element substrate H1100 has nozzle arrays for four colors, namely a nozzle array for the light cyan ink, a nozzle array for the cyan ink, a nozzle array for the magenta ink and a nozzle array for the yellow ink, while the second recording element substrate H1101 has nozzle arrays for four colors, namely a nozzle array for the light magenta ink, a nozzle array for the red ink, a nozzle array for the black ink and a nozzle array for the green ink.

Each nozzle array is formed by 768 nozzles arranged with a pitch of 1200 dpi (dot/inch; reference value) in the conveying direction of the recording medium, each discharging an ink droplet of about 2 picoliters. A discharge port of each nozzle has an aperture area of about 100 $\mu m^2$. The first recording element substrate H1100 and the second recording element substrate H1101 are adhered to the first plate H1200 in which an ink supply aperture H1201 is formed for supplying the first recording element substrate H1100 and the second recording element substrate H1101 with inks.

To the first plate H1200, there is adhered the second plate H1400 having an aperture, and the second plate H1400 holds the electric wiring board H1300 in such a manner as to electrically connect the same with the first recording element substrate H1100 and the second recording element substrate H1101.

The electric wiring board H1300 serves to supply electrical signals for ink discharge from the nozzles formed on the first recording element substrate H1100 and the second recording element substrate H1101, and is provided with electrical wirings corresponding to the first recording element substrate H1100 and the second recording element substrate H1101, and an external signal input terminal H1301 positioned at an end of the electrical wirings and serving to receive electrical signal from the main body of the recording apparatus. The external signal input terminal H1301 is positioned and fixed at a back side of the tank holder H1500.

On the other hand, on the tank holder H1500 supporting the ink tank H1900, a flow path forming member H1600 is fixed for example by ultrasonic fusion, thereby forming an ink flow path H1501 communicating from the ink tank H1900 to the first plate H1200.

A filter H1700 is provided at an end of the ink flow path H1500, at the ink tank side engaging with the ink tank H1900, in order to prevent intrusion of dusts from the exterior. Also a sealing rubber H1800 is provided at an engaging portion with the ink tank H1900 for preventing ink evaporation from the engaging part.

The head cartridge H1000 is constituted by coupling, for example by adhesion, a tank holder formed by the tank holder H1500, the flow path forming member H1600, the filter H1700 and the sealing rubber H1800, and the recording head H1001 formed by the first recording element substrate H1100, the second recording element substrate H1101, the first plate H1200, the electric wiring board H1300 and the second plate H1400.

(Schematic Configuration of Mechanisms of Ink Jet Recording Apparatus)

In the following, there will be explained schematically the configuration of the mechanisms of an ink jet recording apparatus capable of recording by mounting the aforementioned recording head H1001. A main body of the recording apparatus in the present embodiment is constituted, according to the functions of the respective mechanisms, of a sheet feeding section, a sheet conveying section, a carriage section, a sheet discharge section, a cleaning section and an external casing section for protecting these mechanisms and providing an external design. In the following these sections will be explained briefly.

Figure 26:
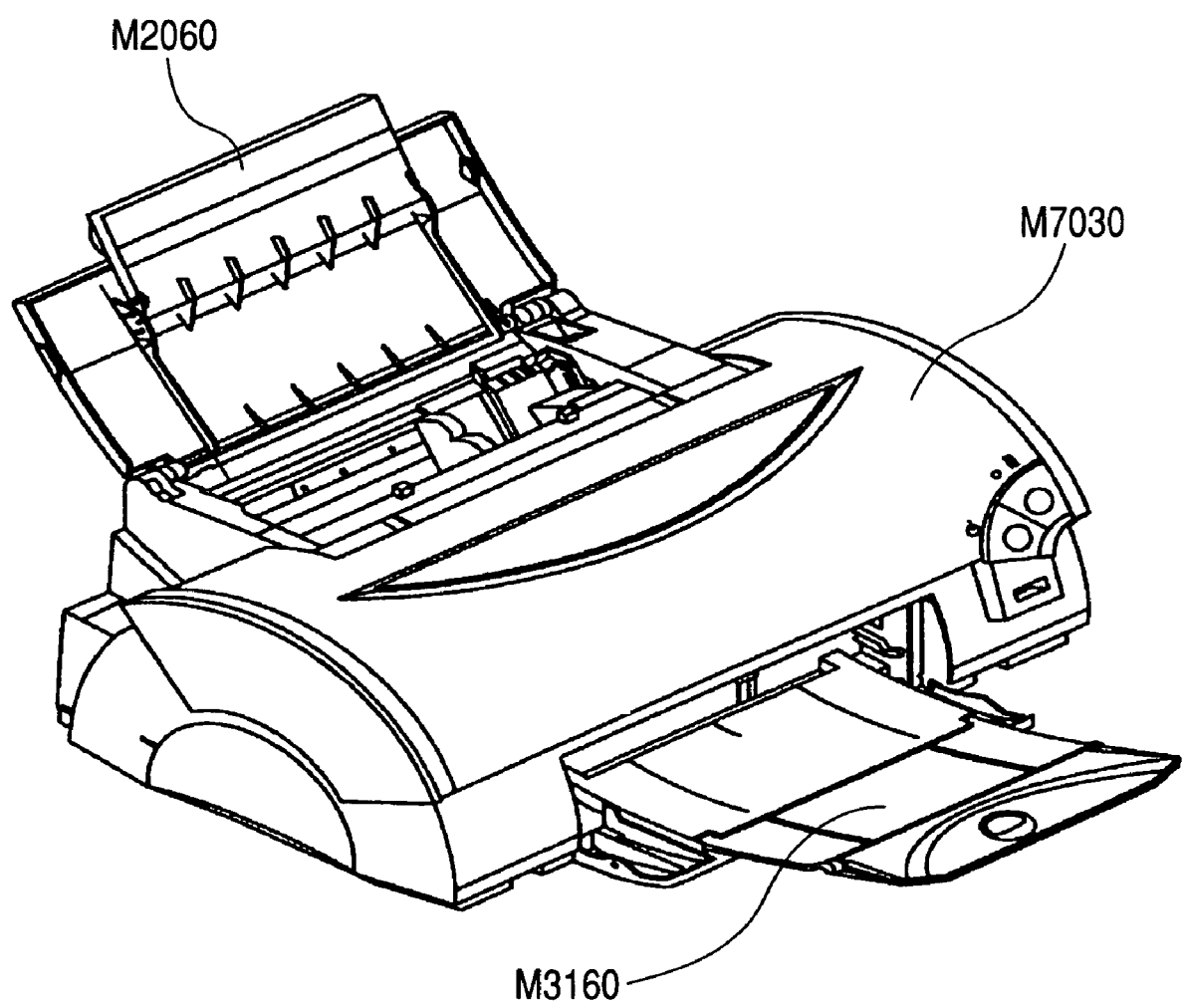
FIG. 26 is a perspective view of a recording apparatus applicable in the first embodiment of the invention.
Figure 27:
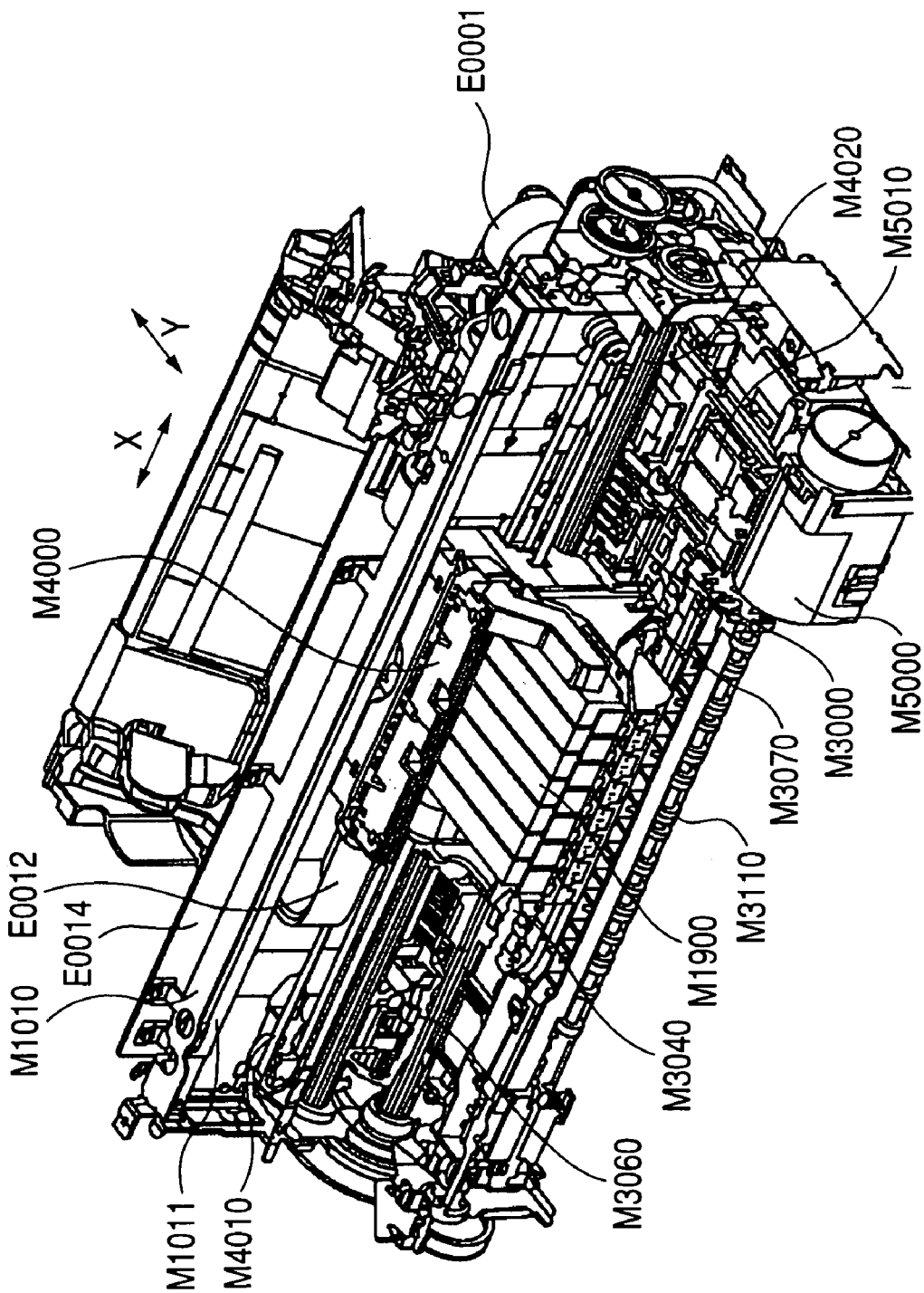
FIG. 27 is a perspective view of a mechanical part of a recording apparatus applicable in the first embodiment of the invention.
Figure 28:
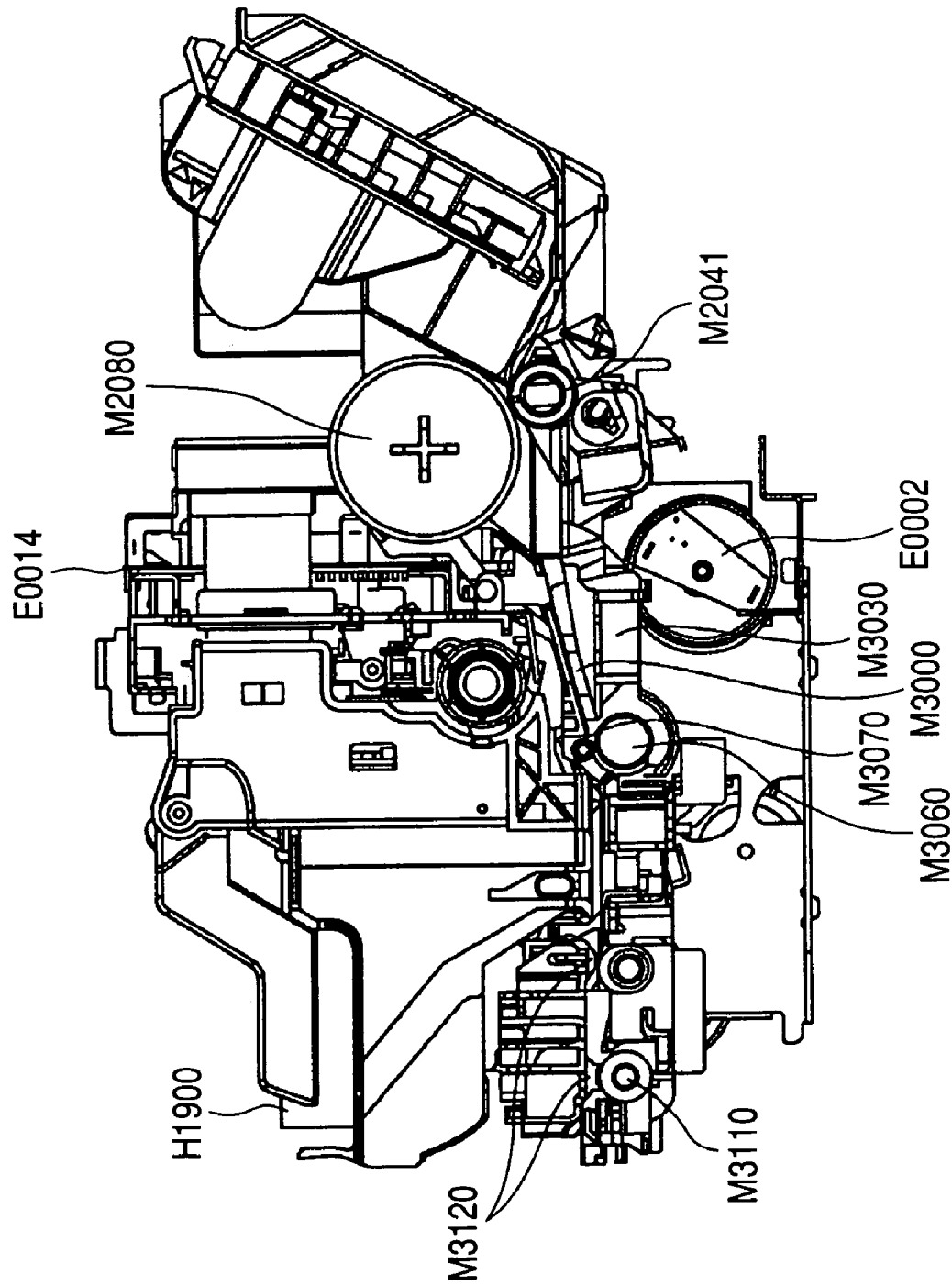
FIG. 28 is a cross-sectional view of a recording apparatus applicable in the first embodiment of the invention.

FIG. 26 is a perspective view of the recording apparatus. Also FIGS. 27 and 28 are views showing internal structure of the main body of the recording apparatus, and are respectively a perspective view seen from upper right, and a lateral cross-sectional view of the main body of the recording apparatus.

In case of sheet feeding in the recording apparatus, in a sheet feeding section including a sheet feeding tray M2060, a predetermined number of recording media are supplied to a nip portion constituted of a sheet feeding roller M2080 and a separation roller M2041. The supplied recording media are separated in the nip portion, and an uppermost recording medium only is conveyed to a sheet conveying section. The recording medium advanced to the sheet conveying section is guided by a pinch roller holder M3000 and a paper guide flapper M3030, and supplied to paired rollers of a conveying roller M3060 and a pinch roller M3070. The paired rollers constituted of the conveying roller M3060 and the pinch roller M3070 are rotated by an LF motor E0002, whereby the recording medium is conveyed over a platen M3040.

The carriage section is provided with a carriage M4000 for mounting the recording head H1001, supported by a guide shaft M4020 and a guide rail M1011. The guide shaft M4020 is mounted on a chassis M1010 and guides and supports the carriage M4000 for enabling a reciprocating scanning motion in a direction perpendicularly to the conveying direction of the recording medium. The carriage M4000 is driven, through a timing belt M4041, by a carriage motor E0001 mounted on the chassis M1010. Also the, carriage M4000 is connected to an unillustrated flexible cable E0012 for transmitting drive signals from an electric board E0014 to the recording head H1001. In case of an image formation on the recording medium in such configuration, the paired rollers of the conveying roller M3060 and the pinch roller M3070 conveys and positions the recording medium in a conveying direction (column direction). Also in a scanning direction (raster direction), the carriage motor E0001 moves the carriage M4000 in a direction perpendicular to the aforementioned conveying direction, thereby positioning the recording head H1001 in a desired image forming position. The recording head H1001 thus positioned discharges inks onto the recording medium according to the signals from the electric board E0014. Details of the recording head H1001 will be described later. In the recording apparatus of the present embodiment, an image is formed on the recording medium by alternately repeating a recording main scan motion in which the carriage M4000 executes a scanning motion under a recording by the recording head H1001, and a sub scan motion in which the recording medium is conveyed by the conveying roller M3060.

Finally, the recording medium bearing the formed image is pinched in a nip of a first discharge roller M3110 and a spur M3120 in the discharge section, thus conveyed and discharged onto a sheet discharge tray M3160.

In the cleaning section, in order to clean the recording head H1001 before or after the image recording, a pump M5000 is activated while a cap M5010 is maintained in close contact with the discharge ports of the recording head H1001, thereby sucking unnecessary ink or the like from the recording head H1001. Also the ink remaining in the cap M5010 is sucked in a state where the cap M5010 is opened, thereby avoiding a solidification of the remaining ink and subsequent drawbacks.

(Variation)

In the present embodiment, a recording method of increasing an application amount of a specific color ink per unit area in comparison with other color inks is realized by employing high-resolution dot placement patterns capable of a high duty recording in relative manner, but such method is not restrictive. Other methods are also usable, such as a method of utilizing placement patterns for dot-on-dot recording, a method of increasing a recording rate of mask patterns employed at the recording, or a method of varying an energy applied to the recording head thereby modulating the discharge amount. Any method capable of increasing the application amount of the specific color ink per unit area in comparison with other color inks is applicable in the present embodiment.

Also in the present embodiment, among the two specific color inks of Green and Red, the maximum application amount is increased for the Green ink only, but it is naturally possible also to increase the maximum application amount also for the Red ink, in case an increased maximum application amount for the Red ink exhibits an effect of expanding the color reproduction range, for example because of an insufficient color developing property of the Red ink. Also in a situation contrary to the present embodiment where the Green ink has a sufficient color developing property while the Red ink has an insufficient color developing property, there is naturally conceivable a configuration of increasing the maximum application amount only for the Red ink. Also in the present embodiment, the maximum application amount for light inks such as light cyan and light magenta is selected same as the maximum application amount for the dense cyan and magenta inks, but the maximum application amount for such light inks may be selected larger than that for the dense inks. For example, it is possible to set the maximum application amount for the light inks same as that for the Green ink. More specifically, a pixel is represented by 8 gradation levels with 8 set us the number of maximum applied dots for CMYKR, while a pixel is represented by 16 gradation levels with 16 set as the number of maximum applied dots for Glclm. Such method allows to reduce a granularity in a low density area where the light inks are used.

Also the present embodiment has been explained by a specific color system of 8-color i.e. GMYKlclmRG in which the specific color ink G with an insufficient color development is recorded with an increased maximum application amount, but the present invention is applicable to any system employing basic colors and at least a specific color. Also the specific color inks are not limited to a Red ink with a sufficient color development and a Green ink with an insufficient color development, and the present embodiment can be expanded or modified and easily applied to any system employing arbitrary specific colors of an arbitrary number.

Second Embodiment

In contrast to the first embodiment utilizing inks of 8 colors, namely cyan, light cyan, yellow, magenta, light magenta, black and specific colors of red and green, the present embodiment does not employ light inks of light cyan and light magenta but adds a specific blue color ink instead. Thus the present embodiment is a system utilizing inks of 7 colors of cyan, yellow, magenta, black, and specific colors of red, green and blue.

The system is suitably modified in its structure and components from the first embodiment according to the kinds of inks, but remains basically unchanged. For example, the color separation tables employed in the post-stage process are modified to generate color separation data of CMYKRGB corresponding to the inks of cyan, yellow, magenta, black, red, green and blue employed in the printer, and the ink tanks are naturally so modified that 7 tanks corresponding to 7 CMYKRGB colors are connected to the recording head, but such modifications are easily realizable for those skilled in the art and are not explained further. In the following, only the featuring portions of the present embodiment will be explained.

The present embodiment is characterized in that the maximum application amount is increased for the specific color inks of blue and green, in comparison with other colors (cyan, yellow, magenta, black and red).

More specifically, as in the case of green ink, the blue ink, by selecting a maximum application amount same as that for the inks of the basic colors, is unable to reach the color reproduction range of the positive film thus incapable of attaining sufficiently the object of approaching to the color reproduction range of the positive film. For such reason, the maximum application amount is selected larger also for the blue ink.

More specifically, an application amount of the blue ink, at a highest chroma point on the a*b* plane at a predetermined lightness in the blue region, is made larger than the maximum application amount of the inks of the basic colors. The dot placement patterns are so set that, for CMYK, a pixel is represented by 8 gradation levels with 8 set as the number of maximum applied dots, and for GB, a pixel is represented by 16 gradation levels with 16 set us the number of maximum applied dots.

Such configuration allows to expand the color reproduction range, close to that of the positive film, also in the blue region on the color space, in addition to the red and green regions, thereby fully exhibiting the effect of the newly added specific color.

Other Embodiments

The foregoing first and second embodiments have been explained by an ink system utilizing inks as recording materials, but the present invention is not limited to such inks as the recording materials and is applicable also to an electrophotographic system utilizing toners as the recording materials.

Also in the foregoing first and second embodiments, there have been explained configurations of utilizing a combination of Red and Green recording materials and a combination of Red, Green and Blue recording materials as the specific color recording materials for expanding the color range, but the present invention is not limited to such configurations. The present invention is applicable to any case utilizing at least a specific color recording material, for example a Green recording material only, a Red recording material only, a Blue recording material only, or a combination of Red and Blue recording materials. Any configuration in which at least a specific color recording material has a maximum application amount larger than that of the recording materials of the basic colors is included in the present invention. It is emphasized that various modifications may be applied to the foregoing embodiments without departing the principle of the present invention. In particular, all the descriptions in the present specification and in the accompanying drawings are merely for the purpose of explanation and are not construed as to limit the present invention.

This application claims priority from Japanese Patent Application No. 2004-023590 filed on Jan. 30, 2004, which is hereby incorporated by reference herein.

What is claimed is:

1. An image forming apparatus for forming an image on a recording medium utilizing applying means capable of applying a cyan recording material, a yellow recording material and a green recording material,
wherein a maximum application amount per unit area of the green recording material is more than a maximum application amount per unit area of each of the cyan and yellow recording materials.

2. An image forming apparatus according to claim 1, wherein, in a case of forming the image of a color having a maximum chroma of a predetermined hue reproducible by the cyan and yellow recording materials, the green recording material is applied in excess of the maximum application amount defined for each of the cyan and yellow recording materials.

3. An image forming apparatus according to claim 2, wherein, in a case of forming the image of the color having the maximum chroma, the cyan and yellow recording materials are used in addition to the green recording material.

4. An image forming apparatus according to claim 1, wherein the green recording material is capable of representing at least one of a higher lightness and a higher chroma than a color reproduction range reproducible on the recording medium by a combination of the cyan and yellow recording materials, and shows a hue angle within the color reproduction range reproducible by the combination of the cyan and yellow recording materials.

5. An image forming apparatus that forms an image on a recording medium utilizing applying means capable of applying recording materials of basic colors of cyan, magenta and yellow and recording materials of first and second specific colors different in hue from the basic colors,
wherein the recording material of the first specific color is different in hue from the recording material of the second specific color,
a maximum application amount per unit area of the recording material of the first specific color is more than a maximum application amount per unit area of each of the recording materials of the basic colors, and
a maximum application amount per unit area of the recording material of the second specific color is less than the maximum application amount per unit area of the recording material of the first specific color.

6. An image forming apparatus according to claim 5, wherein the maximum application amount per unit area of the recording material of the second specific color is the same as the maximum application amount per unit area of the recording materials of the basic colors.

7. An image forming apparatus according to claim 5, wherein the recording material of the first specific color includes a green recording material showing a hue angle within a color reproduction range reproducible by a combination of the cyan and yellow recording materials, and
the recording material of the second specific color includes a red recording material showing a hue angle within a color reproduction range reproducible by a combination of the magenta and yellow recording materials.

8. An image forming method for forming an image on a recording medium utilizing applying means capable of applying recording materials of basic colors of cyan, magenta and yellow and recording materials of first and second specific colors different in hue from the basic colors, comprising:
a step of generating binary data corresponding to the recording materials to be used for forming the image; and
a step of applying the recording materials to the recording medium based on the generated binary data,
wherein the recording material of the first specific color is different in hue from the recording material of the second specific color,
a maximum application amount per unit area of the recording material of the first specific color is more than a maximum application amount per unit area of each of the recording materials of the basic colors, and
a maximum application amount per unit area of the recording material of the second specific color is less than the maximum application amount per unit area of the recording material of the first specific color.

9. An image forming method according to claim 8, wherein the recording material of the first specific color includes a green recording material showing a hue angle within a color reproduction range reproducible by a combination of the cyan and yellow recording materials, and
the recording material of the second specific color includes a red recording material showing a hue angle within a color reproduction range reproducible by a combination of the magenta and yellow recording materials.

10. An image forming apparatus for forming an image on a recording medium utilizing applying means capable of applying a magenta recording material, a yellow recording material and a red recording material,
wherein a maximum application amount per unit area of the red recording material is more than a maximum application amount per unit area of each of the magenta and yellow recording materials.

11. An image forming method for forming an image on a recording medium utilizing applying means capable of applying at least a magenta recording material, a yellow recording material and a red recording material showing, within a CIE-L*a*b* color space, a hue angle within a color reproduction range reproducible by a combination of the magenta and yellow recording materials,
wherein the red recording material is applied in excess of a maximum application amount per unit area of the recording medium, defined for the magenta and yellow recording materials so as to form an image of a predetermined color showing a hue reproducible by the combination of the magenta and yellow recording materials.

12. An image forming apparatus for forming an image on a recording medium utilizing applying means capable of applying a cyan recording material, a magenta recording material and a blue recording material,
wherein a maximum application amount per unit area of the blue recording material is more than a maximum application amount per unit area of each of the cyan and magenta recording materials.

13. An image forming method for forming an image on a recording medium utilizing applying means capable of applying at least a cyan recording material, a magenta recording material and a blue recording material showing, within a CIE-L*a*b* color space, a hue angle within a color reproduction range reproducible by a combination of the cyan and magenta recording materials,
wherein the blue recording material is applied in excess of a maximum application amount per unit area of the recording medium, defined for the cyan and magenta recording materials so as to form an image of a predetermined color showing a hue reproducible by the combination of the cyan and magenta recording materials.

14. An image forming method for forming an image on a recording medium utilizing applying means capable of applying at least a cyan recording material, a yellow recording material and a green recording material showing, within a CIE-L*a*b* color space, a hue angle within a color reproduction range reproducible by a combination of the cyan and yellow recording materials,
wherein the green recording material is applied in excess of a maximum application amount per unit area of the recording medium, defined for the cyan and yellow recording materials so as to form an image of a predetermined color showing a hue reproducible by the combination of the cyan and yellow recording materials.

15. An image processing apparatus capable of generating data corresponding to one or more recording materials to be applied to a pixel on a recording medium, the recording materials including a cyan recording material, a yellow recording material and a green recording material
wherein if generating data corresponding to a color of a maximum chroma of a predetermined hue between a hue of the cyan recording material and a hue of the yellow recording material, the data corresponding to the green recording material is so generated that an application amount of the green recording material to be applied to the pixel becomes in excess of a maximum application amount per unit pixel defined for each of the cyan and yellow recording materials.

16. A data generating apparatus capable of generating data corresponding to one or more recording materials to be applied to a pixel on a recording medium, the recording materials including a magenta recording material, a yellow recording material and a red recording material, wherein
if generating data for representing a color of a maximum chroma of a predetermined hue between a hue of the magenta recording material and a hue of the yellow recording material, data corresponding to the red recording material is so generated that an application amount of the red recording material to be applied to the pixel becomes in excess of a maximum application amount per unit pixel defined for each of the magenta and yellow recording materials.

17. A data generating apparatus capable of generating data corresponding to one or more recording materials to be applied to a pixel on a recording medium, the recording materials including a cyan recording material, magenta recording material and a blue recording material, wherein
if generating data for representing a color of a maximum chroma of a predetermined hue between a hue of the cyan recording material and a hue of the magenta recording material, data corresponding to the blue recording material is so generated that an application amount of the blue recording material to be applied to the pixel becomes in excess of a maximum application amount per unit pixel defined for each of the cyan and magenta recording materials.

* * * * *